United States Patent
Mishra et al.

(10) Patent No.: US 12,289,517 B1
(45) Date of Patent: Apr. 29, 2025

(54) ROBOTIC CONTROL USING NATURAL LANGUAGE COMMANDS

(71) Applicant: Armada Systems, Inc., San Francisco, CA (US)

(72) Inventors: Pragyana K. Mishra, Seattle, WA (US); Alexiy Buynitsky, Sunnyvale, CA (US); Sina Ehsani, Seattle, WA (US)

(73) Assignee: Armada Systems, Inc., San Francisco, CA (US)

( * ) Notice: Subject to any disclaimer, the term of this patent is extended or adjusted under 35 U.S.C. 154(b) by 0 days.

(21) Appl. No.: 18/622,700

(22) Filed: Mar. 29, 2024

(51) Int. Cl.
| | |
|---|---|
| H04N 23/62 | (2023.01) |
| B25J 11/00 | (2006.01) |
| G05D 1/222 | (2024.01) |
| G06F 40/40 | (2020.01) |
| H04N 23/61 | (2023.01) |
| H04N 23/661 | (2023.01) |
| H04N 23/69 | (2023.01) |
| H04N 23/695 | (2023.01) |

(52) U.S. Cl.
CPC ............. *H04N 23/62* (2023.01); *H04N 23/61* (2023.01); *H04N 23/661* (2023.01); *H04N 23/69* (2023.01); *H04N 23/695* (2023.01); *B25J 11/0005* (2013.01); *G05D 1/222* (2024.01); *G06F 40/40* (2020.01)

(58) Field of Classification Search
CPC ...... H04N 23/62; H04N 23/61; H04N 23/661; H04N 23/69; H04N 23/695; G06F 40/40; G05D 1/222; B25J 11/0005
See application file for complete search history.

(56) References Cited

U.S. PATENT DOCUMENTS

| | | | |
|---|---|---|---|
| 11,928,438 B1* | 3/2024 | Das | G06Q 50/18 |
| 11,968,088 B1* | 4/2024 | Yan | G06F 40/30 |
| 11,995,412 B1* | 5/2024 | Mishra | G06F 16/7343 |
| 2013/0325342 A1* | 12/2013 | Pylappan | G06F 40/40 701/400 |
| 2016/0012609 A1* | 1/2016 | Laska | H04N 23/632 382/103 |
| 2023/0178076 A1* | 6/2023 | Abramson | G10L 15/063 704/232 |
| 2023/0252233 A1* | 8/2023 | Gutierrez | G06F 40/20 704/9 |
| 2023/0326212 A1* | 10/2023 | Chawda | G06V 10/82 382/103 |
| 2023/0394335 A1* | 12/2023 | Cross | G06V 10/52 |

* cited by examiner

*Primary Examiner* — Amy R Hsu
(74) *Attorney, Agent, or Firm* — Athorus, PLLC

(57) ABSTRACT

Disclosed are systems and methods to control a robotic device using natural language commands. A natural language command may be received by a system. The system may convert the command into low-level machine controls and logic for implementation by a robotic device to achieve a desired action. In some instances, an API module may include mapping data to associate high-level commands with low-level machine controls. A language model may process the natural language command (input), high-level commands, and/or other information, such as system state, sensor observation data, parameters, etc., to determine one or more commands to execute by a robotic device and possibly logic for execution by the robotic device. The robotic device may receive the low-level machine controls and logic to cause the robotic device to perform the requested actions.

20 Claims, 13 Drawing Sheets

ROBOTIC CONTROL USING NATURAL LANGUAGE COMMANDS

BACKGROUND

Many existing devices enable users to control device operation from remote locations. For example, a remotely controlled quadcopter (or "drone") may be controlled by a dedicated remote control device or a mobile phone running an application that controls the drone. These remotely controllable devices are capable of reading and executing specific machine instructions, often called low-level machine controls. In the example with the drone, an application running on a mobile phone may be hard coded with the low-level machine controls that the application sends to the drone wirelessly to control operation of the drone. Meanwhile, a user that interacts with the application must use predefined controls as input to the application. The predefined controls may be presented as buttons, selectors, radial controls, or other preset controls. For more complex devices, a user may require training to understand the capabilities of the device being controlled and to understand the controls available for the device, which requires training time and use of additional resources.

Deploying a new version of a remotely controlled device requires manual creation of an interface or controls for operating the remotely controlled device. For example, a developer may have to manually create an interface or other controls that are useable by an operator that desires to control the device. Those controls are then manually mapped to low-level machine controls that are readable by the device. This process takes time and restricts the ways that a user can interact with the remotely controlled device.

DETAILED DESCRIPTION

Figure 1A:
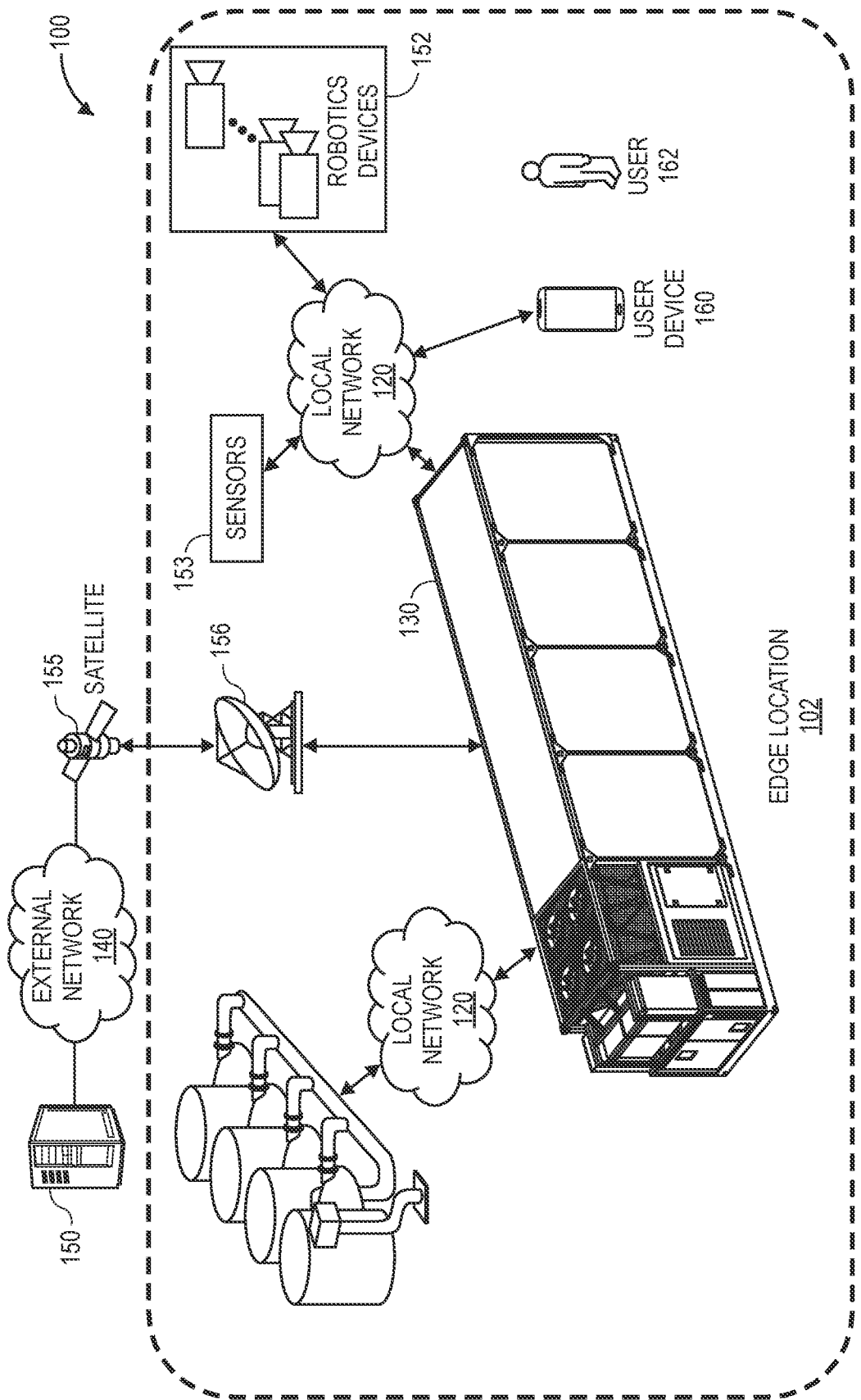
FIG. 1A is an illustration of an edge location with different sensors and robotic devices and an edge computing apparatus, in accordance with disclosed implementations.

The systems and methods of the present disclosure are directed to controlling robotic devices using natural language commands that are provided by a user. In accordance with various embodiments, a user may speak or otherwise input a natural language command for receipt by a computing system. The command may be unstructured instructions or layman instructions and may not follow or be closely associated with low-level machine controls or even high-level controls that are based on the low-level machine controls. Instead, the user may use conversational speech to make a requested action to be performed by the robotic device, such as a multiaxial camera device, a remotely controlled vehicle, a mechanical arm, a robotic appliance, or other robotic device. As an example, the user may state a command such as "Drive me home and stop at the grocery store along the way." Meanwhile, the low-level machine controls to perform this action may be vastly different.

In various embodiments, a computing system may deploy a natural language model (or "LM"), such as a large language model (or "LLM"), to translate the user request to actionable commands and logic that can be sent to the robotic device to execute the requested action. The actionable commands may be converted to low-level machine controls prior to being sent to the robotic device. The robotic device may then execute the low-level machine controls and logic to perform the requested action.

The LM may be trained to translate user commands to predefined high-level commands that are associated with a specific robotic device, a specific type of robotic device, or associated with a class of robotic devices. The LM may receive inputs, such as a mapping of high-level commands to low-level machine controls, sensor observations, system state/status information, and/or possibly other information related to controls or related to the robotic device. The LM may determine whether the user request is possible based on received information and training data. For example, in some instances, a user may request an action that a robotic device cannot perform (e.g., panning is not possible by a fixed camera). If the request is determined to be possible based on capabilities of the robotic device and possibly other constraints and information, the LM may provide one or more selected high-level commands that may be ultimately sent to the robotic device as one or more low-level machine controls to cause the robotic device to perform actions requested by a user.

As an example, when the robotic device is a multiaxial camera device, a user may provide a natural language command of "track the cars in the parking lot and zoom in when people enter or exit cars" to cause the multiaxial camera device to perform one or more requested operations intended by the natural language command. The natural language command may not relate closely to actual commands (i.e., the low-level machine controls) that are ultimately used by the robotic device to cause the requested operation. The natural language command may also not include the express logic (e.g., software logic such as loops and conditions, etc.) to perform the requested operation, although the logic may be deduced from the natural language request. In this example, the user requested operations may require at least object detection by analysis of captured imagery, tracking of those objects possibly by moving a camera in the multiaxial camera device, and modifying zoom controls (e.g., digital and/or optical). In addition, some of these actions may be repeated using coded logic (e.g., track vehicle until it leaves the scene, track new vehicle entering scene, etc.).

In accordance with some implementations, an application program interface (or "API") module may be in communication between the LM and the robotic device. The API module may include and maintain a mapping of high-level commands to low-level machine controls that are executed by the robotic device. The LM may receive the natural language command from the API module (or other device) and associate the natural language command with one or more high-level commands using the mapping provided by the API module. The API module may receive high-level commands from the LM and associate those commands to low-level machine controls. The API module may send the low-level machine controls to the robotic device for execution.

In some embodiments, the API module may be updated, created, or otherwise modified to enable control of a new or different robotic device. For example, the API may be capable of controlling different camera devices that include different operational parameters (e.g., zoom features, panning abilities, etc.). The API module may perform a calibration or other initiation process with the robotic device to determine the available low-level machine controls for a respective robotic device. In this way, a developer may rely on the API module to create at least some mappings between the high-level commands and the low-level machine controls rather than having the developer manually create all of these mappings.

Referring to FIG. 1A, illustrated is a view of an edge location with different sensors and robotic devices and an edge computing apparatus, in accordance with disclosed implementations. Robotic devices may be any type of device capable of executing machine instructions to perform operations. For example, a robotic device may be a multiaxial camera device (e.g., a pan/tilt/zoom camera or "PTZ" camera) that can be controlled using machine instructions, often called low-level machine controls. Other examples of robotic devices include robotic arms, aerial drones, remotely controlled vehicles, robotic appliances (e.g., vacuums, carts, etc.), and other robotic workers.

As is shown in FIG. 1A, a system 100 includes an edge location 102 and an edge computing unit 130 provided in association with the edge location 102. The edge computing unit 130 may be in communication with any number of devices or systems at the edge location 102 over a local network 120, and also with any number of devices or systems, e.g., an external processing system 150, over an external network 140 that may include the Internet in whole or in part. In particular, as is shown in FIG. 1A, the edge computing unit 130 may access the external network 140 or the external processing system 150 by way of one or more satellite dishes 156 at the edge location 102 with one or more satellites 155, which may provide a backhaul connection with the external network 140.

The edge location 102 shown in FIG. 1A may be any type of location at which remote computing is necessary or desirable. For example, and not by way of limitations, the edge location may be a processing plant, a refinery, a stadium, a warehouse, a geological excavation site, a military outpost, etc. Alternatively, or additionally, the edge location 102 may be any other facility or location at which humans may engage in one or more operations, such as an agricultural site (e.g., a farm), an industrial site (e.g., a plant or factory), a tourist attraction (e.g., a remote hotel or park), or any other site. In some implementations, the edge location 102 may be a location where power or network connectivity from traditional power grids or other sources, e.g., alternating current ("AC") power in any number of phases and at any frequency or voltage, or direct current ("DC") power at any voltage, are limited or unavailable at one or more times during any given day. Moreover, in some implementations, the edge location 102 may include any number of assets, such as systems or components for capturing or sensing information or data, e.g., cameras or other sensors 153, as well as vehicles of any type or form, which may be crewed or uncrewed, and possibly including other robotic devices.

The edge computing unit 130 may be a computer system that includes any number of servers, processors, data stores, transceivers, switches, or other computer components or systems, as well as any number of power units, environmental control systems, isolation systems, or systems. Power units of the edge computing unit 130 may include any number of batteries, diesel engines, solar panels, or other power sources. Environmental control systems of the edge computing unit 130 may include any number of heating units, air conditioning units, fans, dampers, valves, humidifiers, dehumidifiers, or other systems for controlling environmental conditions within or around the edge computing unit 130. Isolation systems of the edge computing unit 130 may include any number of components for isolating internal portions of the edge computing unit 130 from an external environment at the edge location 102, and may form or define chambers having any number of covers, sides, bottoms, doors, or other components formed from any suitable materials. Alternatively, or additionally, the edge computing unit 130 may include any number of other components or systems.

Components of the edge computing unit 130 may be provided in a housing, such as a containerized unit, that is configured to maintain such components at desired temperatures, pressures, humidity levels or others, while protecting such components against the elements or any other adverse conditions at the edge location 102. The edge computing unit 130 may have been transported to the edge location 102 by one or more external propulsion units, e.g., aircraft, road tractors, ships, trailers or trains, or others, and may include one or more motors or other systems for reorienting or repositioning itself at the edge location 102.

The local network 120 may include any number of networks or other systems or techniques for communicating via any wired or wireless systems or protocols, including but not limited to a mobile network (e.g., cellular, long term evolution (or "LTE"), 5G, or other iterations of mobile communication), Wireless Fidelity (or "Wi-Fi"), radio frequency identification (or "RFID"), near-field communication (or "NFC") readers, Bluetooth®, or any other type of systems or protocols. For example, in some implementations, the local network 120 may include any number of access points, switches, routers or other components that may be configured to enable the exchange of information or data between one or more sensors, devices or other assets provided at the edge location 102 and the edge computing unit 130 over any number of systems or protocols.

The external network 140 may be any wired network, wireless network, or combination thereof, and may comprise the Internet in whole or in part. In addition, the external network 140 may be a personal area network, local area network, wide area network, cable network, satellite network, mobile network, or combination thereof. The external network 140 may also be a publicly accessible network of linked networks, possibly operated by various distinct parties, such as the Internet. In some embodiments, the external network 140 may be a private or semi-private network, such as a corporate or university intranet. The external network 140 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and need not be described in more detail herein.

Any combination of networks or communications protocols may be utilized by the local network 120 or the external network 140 in accordance with the systems and methods of the present disclosure. For example, devices or systems connected to the local network 120 or the external network 140 described herein may be configured to communicate via an open or standard protocol such as Wi-Fi. Alternatively, devices or systems connected to the local network 120 or the external network 140 may be configured to communicate with one another directly outside of a centralized network, e.g., by a wireless protocol such as Bluetooth®, in which two or more of such components may be paired with one another.

The external processing system 150 may include any number of physical computer servers having one or more computer processors and any number of data stores (e.g., databases) associated therewith, as well as being provided for any specific or general purpose. For example, the external processing system 150 may be independently provided for the exclusive purpose of receiving, analyzing or storing information or data received from the edge computing unit 130 or, alternatively, provided in connection with one or more physical or virtual services that are configured to receive, analyze or store such information or data, as well as to perform one or more other functions. In some implementations, the external processing system 150 may be provided in a physical location. In other such implementations, the external processing system 150 may be provided in one or more alternate or virtual locations, e.g., in a "cloud"-based environment.

The satellite 155 may be any system that is configured to relay signals containing information or data between two or more computer devices or systems while orbiting the Earth. For example, the satellite 155 may be a portion of a propagation path of a communication link between two or more computer devices or systems that orbits the Earth. Alternatively, or additionally, the satellite 155 may be any other airborne or spaceborne device or system, e.g., an airliner, a drone, or a balloon, that may but need not travel in outer space or orbit the Earth to relay signals between the edge computing unit 130 and the external network 140 or the external processing system 150.

Although only a single satellite 155 is shown in FIG. 1A, the edge computing unit 130 may be configured to communicate with the external network 140, or any external processing systems 150, by way of any number of satellites 155. Moreover, in some implementations, the edge computing unit 130 may be configured to communicate with the external network 140 by the transmission or receipt of data by any other means or techniques other than the satellite 155.

In accordance with some embodiments, the edge computing device 130 may be in communication with one or more robotic device 152 and a user device 160 via the local network 120. The robotic device 152 may include a device that can receive commands from the user device 160 and execute those commands to perform a requested action. Example robotic devices include multiaxial camera devices, remotely controlled vehicles, a mechanical arms, robotic appliances, or other robotic devices controlled directly or indirectly by a user 162.

The user 162 may provide a natural language command input, such as by input of a voice command or text command to the user device 160. The user device 160 may send the natural language command to the edge computing device 130 for processing using techniques described here to convert the natural language command into commands executable by the robotic device 152. In some implementations, the edge computing device 130 may exchange information with the external processing system 150 to assist in converting the natural language command into commands executable by the robotic device 152. In instances where all processing is performed locally via the edge computing device 130 and other devices in communication via the local network 120, processing may be performed with less latency and in a more secure manner than when information is exchanged via the external network 140 with other devices such as the external processing system 150.

Edge computing units 130 of the present disclosure may have any size or shape, and take any form. In some implementations, edge computing units 130 may be provided in standardized containers, thereby enabling such units to be rapidly transported to any location by a single mode or in an intermodal fashion, e.g., by air, sea or land, and positioned in place using standard equipment such as cranes, forklifts, or other machinery. The edge computing units 130 may contain or have ready access to critical infrastructure such as power, climate control systems, security features, fire protection systems or access control systems. The edge computing units 130 may also include integrated hardware components and software applications programmed thereon prior to deployment, such that the edge computing units may be activated and placed into service following installation without delay.

Edge computing units 130 of the present disclosure may further include sufficient power for sustaining operations of such units, and ensuring redundancy even during downtime such as maintenance, updating or repairs. The edge computing units 130 may operate based on alternating current ("AC") electrical power, direct current ("DC") electrical power, or power from any other source. In some implementations, the edge computing units may operate on 480 volt, three-phase, 60 Hertz AC power. In some other implementations, the edge computing units 130 may be configured for operation on 220 to 230 volt, single-phase AC power at any frequency. Alternatively, the edge computing units may operate using AC power or DC power at any voltage, power level or frequency.

Edge computing units 130 of the present disclosure may also include any number of servers or other computer devices or systems, as may be required in order to execute any desired applications or perform any desired functions. In some implementations, the edge computing units 130 may include server racks that are isolated or otherwise configured for resistance against shocks or vibrations during transportation and/or operations.

Edge computing units 130 may be operated independently or as members of groups (e.g., a fleet of such units), and may communicate over local networks 120 at local sites where the edge computing units are employed, e.g., via short-range wired or wireless networks, or over backhaul links to the Internet or other computer networks via wired, wireless or satellite connections. The edge computing units 130 may be programmed with software applications for overseeing operations at a local site, as well as power, data transmission and connectivity of the edge computing units, for simplifying the deployment and management of applications with asset-aware resource provisioning, for managing workloads deployed to edge computing units or other assets at local sites with automatic resource provisioning, job assignment or cancellation features, and for maintaining security and access controls for the edge computing units and other assets.

Figure 1B:
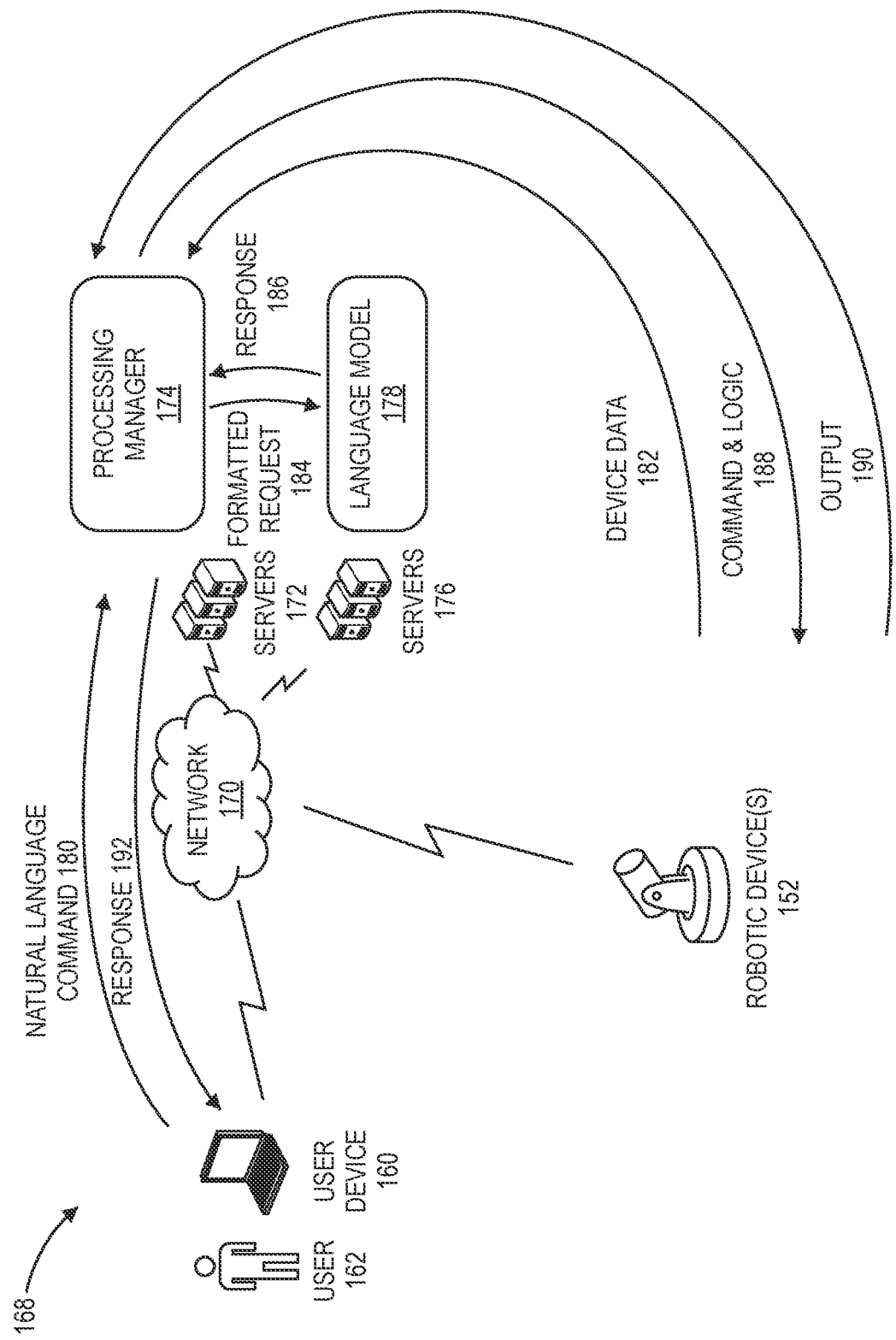
FIG. 1B is a schematic diagram of an illustrative environment to provide natural language control of robotic devices, in accordance with disclosed implementations.

FIG. 1B is a schematic diagram of an illustrative environment 168 to provide natural language control of robotic devices, in accordance with disclosed implementations. The environment 168 may include the user 162 and the user device 160 (also shown in FIG. 1A), which may be used to communicate, via one or more networks 170, with servers 172 that host a processing manager 174. The processing manager 174 may be implemented as one or more components that may facilitate control of the robotic device(s) 152 by exchanging messages with servers 176 that host a language model (or "LM") 178 and exchanging messages with the user 162 via the user device 160 or other devices. The networks 170 may be wired networks, wireless networks, or a combination of both. The various hardware may be distributed across different locations or may be located at a same location, such as an edge location as described herein. The components of the processing manager 174 are described in further detail below with reference to FIGS. 5 and 6.

In accordance with various embodiments, the user 162 may issue a natural language command 180 to cause the robotic device(s) 152 to perform a sequence of operations. The natural language command may include unstructured instructions for performance of some action, event, or other task requested by the user and to be completed by the robotic device(s) 152. The sequence of operations may include one or more operations or an operation with multiple sub-operations (e.g., steps, code, logic, etc.). As an example the natural language command may be "monitor the pressure of vessel A and reduce the pressure using valve X when the pressure exceeds 500 psi." The robotic device may include a camera or other sensor feed to receive the pressure value and an actuator to adjust a valve X to reduce pressure of the vessel A.

The natural language command 180 may be received by the processing manager 174 hosted by the servers 172. The processing manager 174 may also receive data 1820 from the robotic device(s) 152, such as system state data, operational parameters, observation data, and/or other data captured by the robotic device(s) and/or about the robotic device(s). The processing manager 174 may translate some or all of the obtained data to create a formatted request 184 (or series of requests) to send to the LM 178 hosted by the servers 176. The formatted request 184 may provide the LM with information to understand the request and provide as output a response 186 that can be used to provide command and logic 188 to the robotic device(s) 152 to cause the robotic device(s) to perform the series of operations specified in the natural language command 180. For example, the system state data, operational data, and observation data may include a position of the valve X and pressure of the vessel A, as well as a status of the robotic device (e.g., powered on, ready), etc.

The processing manager 174 may format the response 186 from the LM 178 and/or other data prior to determining the command and logic 188 to send to the robotic device(s) 152. In some embodiments, the processing manager 174 may include an application program interface with mapping of low-level commands for the robotic devices with high level commands that are understandable by the LM 178 to create the response 186. The processing manager 174 may send low-level commands specific to a particular robotic device, and logic to implement the command if relevant, as the command and logic 188 for receipt by the robotic device(s) 152. As an example, the logic may include an "until" condition for the valve X, where the logic may indicate to open the valve X until the pressure is less than 500 psi and then close the valve.

After execution of the command and logic 188 by the robotic device(s) 152, the robotic device(s) 152 may send an output 190 (or series of outputs) to the processing manager 174. The output 190 may include textual data, visual data, signal data, binary data, or other outputs indicating actions performed by the robotic device(s), imagery captured, location information, and/or other relevant data depending on the type of robotic device, the type of natural language command, and other factors. The processing manager 174 may format the output, such as translating the output to textual information for consumption by the user 162. The processing manager 174 may send a response 192 to the user 162 via the user device 160, which may be based on the formatted/translated output received from the robotic device(s) 152. The output may include a pressure of the vessel A possible over time, when the valve X was opened, and/or other data indicating operation of the robotic device, a status of the vessel A, or other relevant data for the user.

Additional processes may be performed by the processing manager 174 and using the environment, as described in the following description. Exemplary components of the processing manager 174 are described with reference to FIGS. 5 and 6 while exemplary operations of components are described with reference to FIGS. 7-10. Meanwhile, FIGS. 2A, 2B, 3A, 3B, and 4 describe hardware elements usable to implement the components and processes described herein.

Figure 2A:
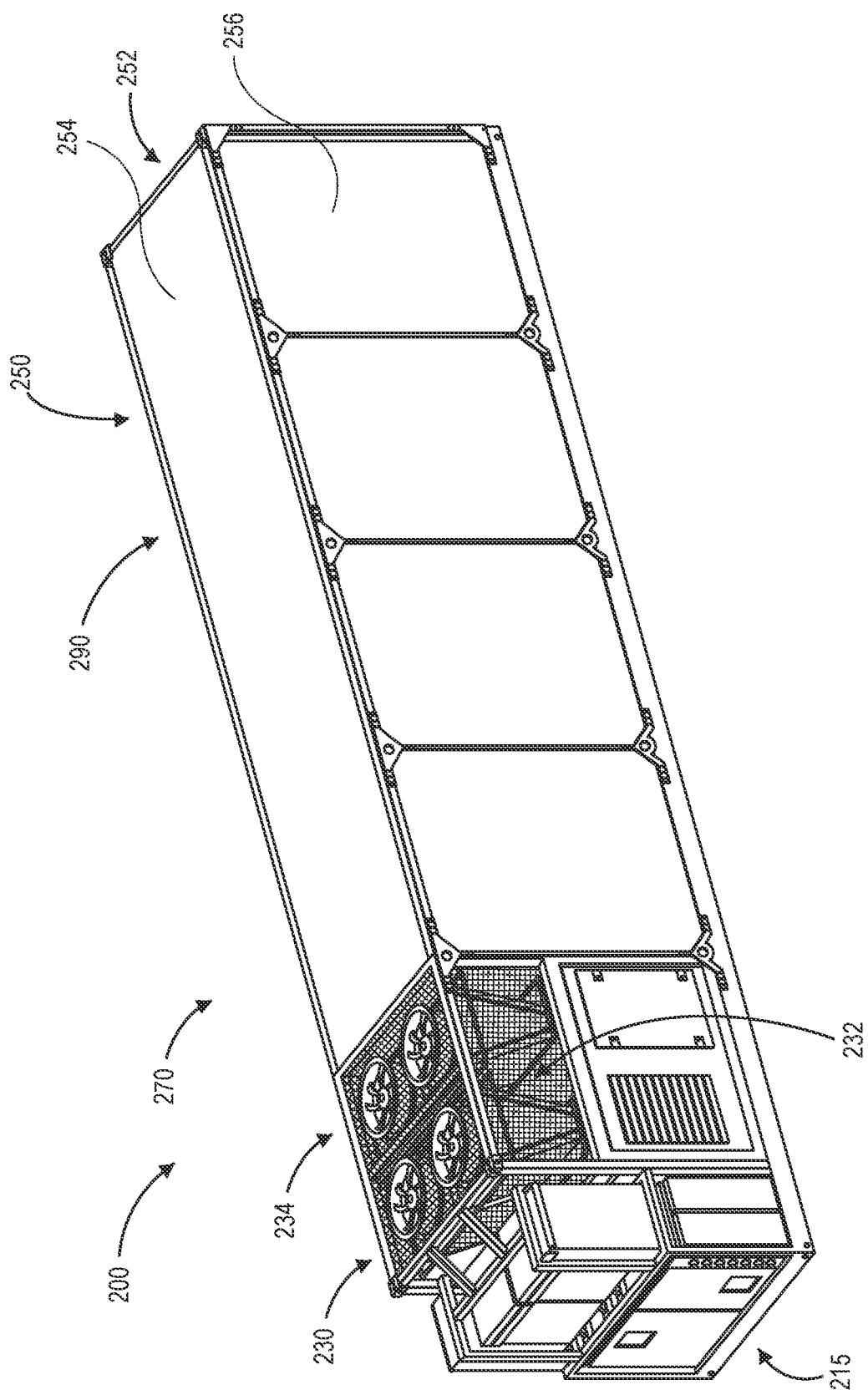
FIGS. 2A and 2B are example illustrations of an edge computing apparatus, in accordance with disclosed implementations.
Figure 2B:
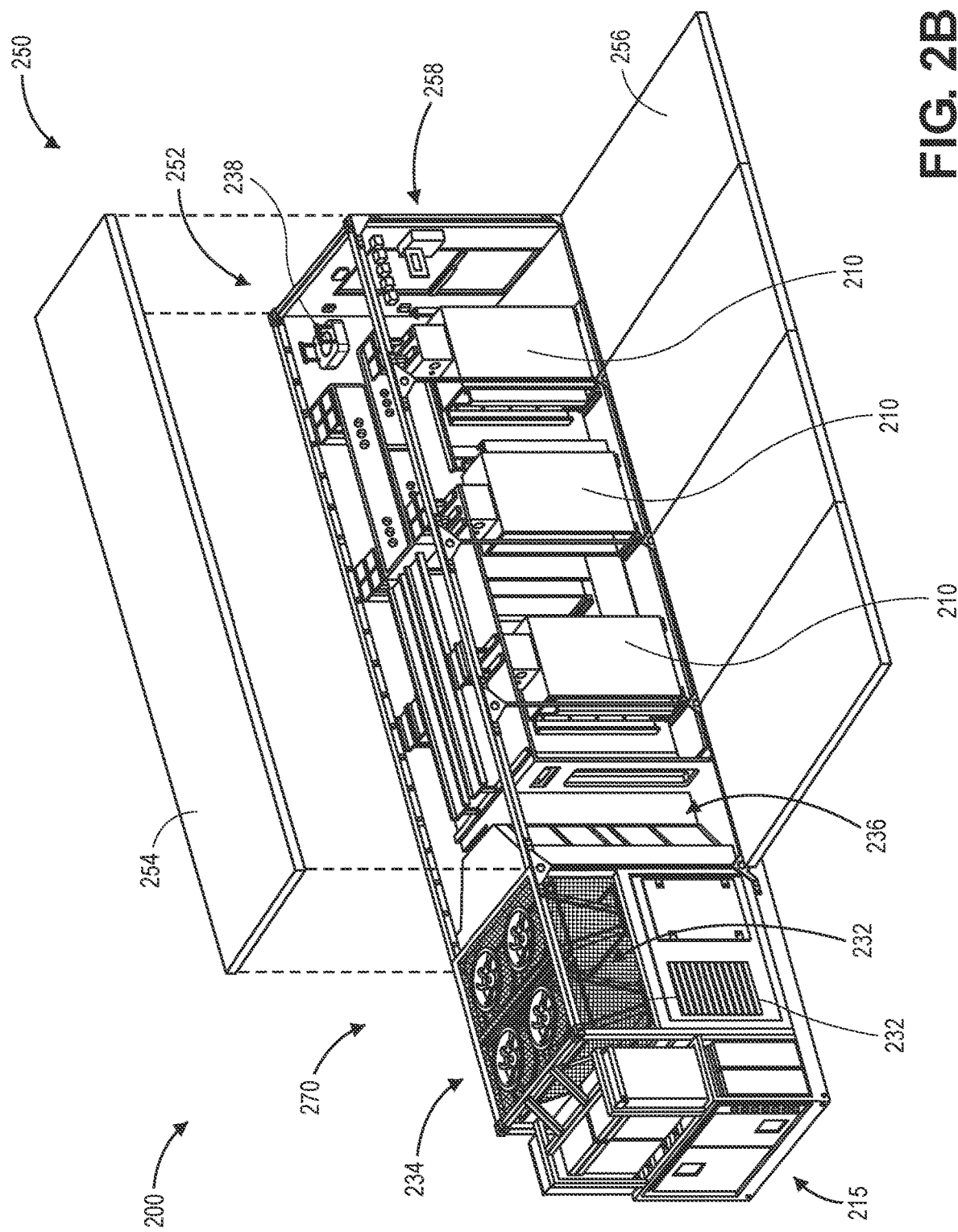

FIGS. 2A and 2B show an example of an edge computing apparatus 200 of the present disclosure. As is shown in FIGS. 2A and 2B, the edge computing apparatus 200 comprises a plurality of server racks 210, a plurality of power units 215, a plurality of environmental control systems 230 and an isolation system 250 disposed in a housing 270 having a form of a containerized unit 290. The edge computing apparatus 200 may be deployed to particular sites or locations, which may be referred to herein as "local sites" or "edge locations," using one or more external propulsion units such as aircraft, road tractors, ships, trailers, trains, or others, which may be configured to lift, carry or otherwise transport the edge computing apparatus 200 to such locations, e.g., over substantially long distances. Alternatively, the edge computing apparatus 200 may further include propulsion units that are integrated with the edge computing apparatus 200, such as motors, engines, drive train components, transmissions, axles, wheels or other features. For example, in some implementations, the edge computing apparatus 200 may be an integral component of a road tractor, a trailer or a train. In some implementations, the edge computing apparatus 200 may further include one or more internal propulsion systems, e.g., electrical motors, which may be used to subsequently move or relocate the edge computing apparatus 200 for short distances upon an arrival at a local site or an edge location.

The server racks 210 may include any number of computing components, units or systems. For example, in some implementations, each of the server racks may include one or more central processing units, as well as data stores or other memory components, networking systems, power supplies, high-performance computing units, e.g., graphical processing units, field programmable gate arrays, vision processing units, associative processing units, tensor processing units, neuromorphic chips, quantum processing units, or the like. Numbers of the respective processor units or other components within each of the server racks 210 may be selected for redundancy or for resiliency, or on any other basis. Moreover, the networking systems may include one or more routers, networking switches, out-of-band switches, or systems for communication between the respective server racks 210 or any number of components of the edge computing apparatus 200 within the housing 270, or for communication with any number of external systems (not shown).

The edge computing apparatus 200 may further include one or more power units 215, which may include any number of components for generating or storing energy in any form. For example, in some implementations, the power units 215 may include any number of batteries or other power cells, e.g., dry cell or wet cell batteries such as lead-acid batteries, lithium-ion batteries, nickel cadmium batteries or nickel metal hydride batteries, or any other type, size or form of batteries. In some implementations, the power units 215 may further include one or more diesel engines, electric engines, or engines or motors that are powered by any other source of energy, e.g., gasoline, natural gas, fuel cells, nuclear reactors, solar power, or others. The power units 215 of the edge computing apparatus 200 may be selected on any basis, such as their respective peak or mean voltages, peak or mean load currents, charge times, fuel capacities, or other attributes.

In some implementations, the power units 215 may be coupled to one or more solar panel arrays that are included in, coupled to, or otherwise associated with surfaces of the edge computing unit 200. For example, solar panel arrays may be attached to a top surface of the housing 270, or in any other portion of the housing 270. The solar panel arrays may be fixed in position, or foldable, collapsible, or otherwise movable between deployed and stowed positions, and exposed in order to generate electrical power using sunlight incident upon surfaces of the solar panel arrays. Electrical power generated by solar panel arrays may be transferred to the power units 215 and used to power the edge computing unit 200 and its constituent components.

The edge computing apparatus 200 may further include one or more environmental control systems 230 in order to maintain or establish a desired set of environmental conditions (e.g., temperature, pressure, humidity, or others) within the edge computing apparatus 200. For example, the environmental control systems 230 may include, but need not be limited to, one or more air conditioning units 232, fans 234, dampers 236 and heaters 238. The air conditioning units 232 may be formed from metals, plastics or other suitable materials and include any number of compressors, condensers, evaporators or other systems for maintaining or reducing air temperatures within the edge computing apparatus 200. The environmental control systems 230 may include any number of fans 234 for initiating air flows into the air conditioning units 232 or throughout the housing 270. The environmental control systems 230 may also include one or more dampers 236 for initiating, isolating or regulating flows of air into, throughout or out of the edge computing apparatus 200. The environmental control systems 230 may further include one or more heaters 238 of any type or form, e.g., electric, gas, kerosene, propane, or others, which may include any number of systems for maintaining or increasing air temperatures within the edge computing apparatus 200.

The environmental control systems 230 shown in FIGS. 2A and 2B are integral to the edge computing apparatus 200. Alternatively, or additionally, the edge computing system 200 may include any number of other environmental control systems (not shown) that operate in a standalone manner, external to the edge computing apparatus 200, in order to maintain or establish a desired set of environmental conditions within the edge computing apparatus 200.

As is shown in FIGS. 2A and 2B, the edge computing apparatus 200 may further include an isolation system 250 for isolating internal portions of the edge computing apparatus 200 from an external environment. The isolation system 250 may include a chamber 252 defined by a top cover 254, a plurality of sides 256 and a door 258.

The isolation system 250 may be configured to secure contents of the edge computing apparatus 200, e.g., the server racks 210 or others, and to protect such contents from the elements while also restricting unauthorized access or entry into the chamber 252. For example, the isolation system 250 may be closed and sealed to maintain the chamber 252 in any desired condition, e.g., at selected levels of temperature, pressure and humidity, and access to the chamber 252 may be provided by way of the door 258 following the operation of one or more access control systems, e.g., any remotely activated locking systems for such doors or other portals. Components of the isolation system 250 may have any quality, strength or security ratings. Furthermore, materials from which the cover 254, the sides 256 or the door 258 are formed or constructed may be selected to further provide radiofrequency shielding or to serve other protective functions for contents of the chamber 252.

Components of the isolation system 250 may also serve one or more other purposes, in addition to enclosing and securing portions of the edge computing apparatus 200 contents of the chamber 252 therein. For example, portions of the isolation system 250 may also provide structural support to the housing 270 or any other portions of the edge computing apparatus 200.

The housing 270 may have any size or shape, and may take any form. In some implementations, the housing 270 may be a shipping container, or a similar vessel, of any standard shape or length. For example, in some implementations, the housing 270 may be a 40-foot vented shipping container constructed from steel and having one or more steel frames and/or castings that are sufficiently durable and strong enough to accommodate cargo, and to withstand impacts due to stacking, shocks or other contact during normal operation. In other implementations, the housing 270 may be made from a non-steel material, which may be appropriate where the containerized units 290 are deployed across wide geographical areas and need not be stacked, enabling lighter and more cost-effective materials other than steel to be used to form the housing 270. Additionally, in some implementations, the housing 270 may take the form of an intermodal container having standard dimensions including widths of approximately eight to eight-and-one-half feet (8 to 8.5 ft) and lengths of twenty, forty, forty-five, forty-eight or fifty-three feet (20, 40, 45, 48 or 53 feet) and heights of approximately eight to ten feet (8 to 10 ft), typically eight-and-one-half or nine-and-one-half feet (8.5 or 9.5 ft).

Implementations of the present disclosure may be operated, performed or executed by any type or form of computing device, apparatus or system, and need not be limited to the edge computing apparatus 200 of FIGS. 2A and 2B. Such devices, apparatuses or systems may include, but need not be limited to, cameras, mobile devices (e.g., smartphones, tablet computers, or the like), desktop computers, laptop computers, wearable devices (e.g., glasses or headsets for augmented reality or virtual reality, wrist watches, or others), servers, autonomous vehicles, robotic devices, televisions that may include one or more processors, memory components or data stores, displays, sensors, input/output (or "I/O") devices, or other systems or components that may be configured to execute one or more sets of instructions or commands described herein.

Moreover, the systems and methods described herein may be implemented in electronic hardware, computer software, firmware, or any combination thereof. For example, in some implementations, processes or methods described herein may be operated, performed or executed using computer-readable media having sets of code or instructions stored thereon. Such media may include, but need not be limited to, random-access memory ("RAM") such as synchronous dynamic random-access memory ("SDRAM"), read-only memory ("ROM"), non-volatile random-access memory ("NVRAM"), electrically erasable programmable read-only memory ("EEPROM"), FLASH memory, magnetic or optical data storage media, or others. Alternatively, or additionally, the disclosed implementations may be realized at least in part by a computer-readable communication medium that carries or communicates program code in the form of instructions or data structures and that may be accessed, read, and/or executed by a computer. Additionally, code or instructions may be executed by one or more processors or other circuitry. For example, in some implementations, such components may include electronic circuits or hardware, programmable electronic circuits such as microprocessors, graphics processing units ("GPU"), digital signal processors ("DSP"), central processing units ("CPU") or other suitable electronic circuits, which may be executed or implemented using computer software, firmware, or any combination thereof, to perform the various operations described herein.

Figure 3A:
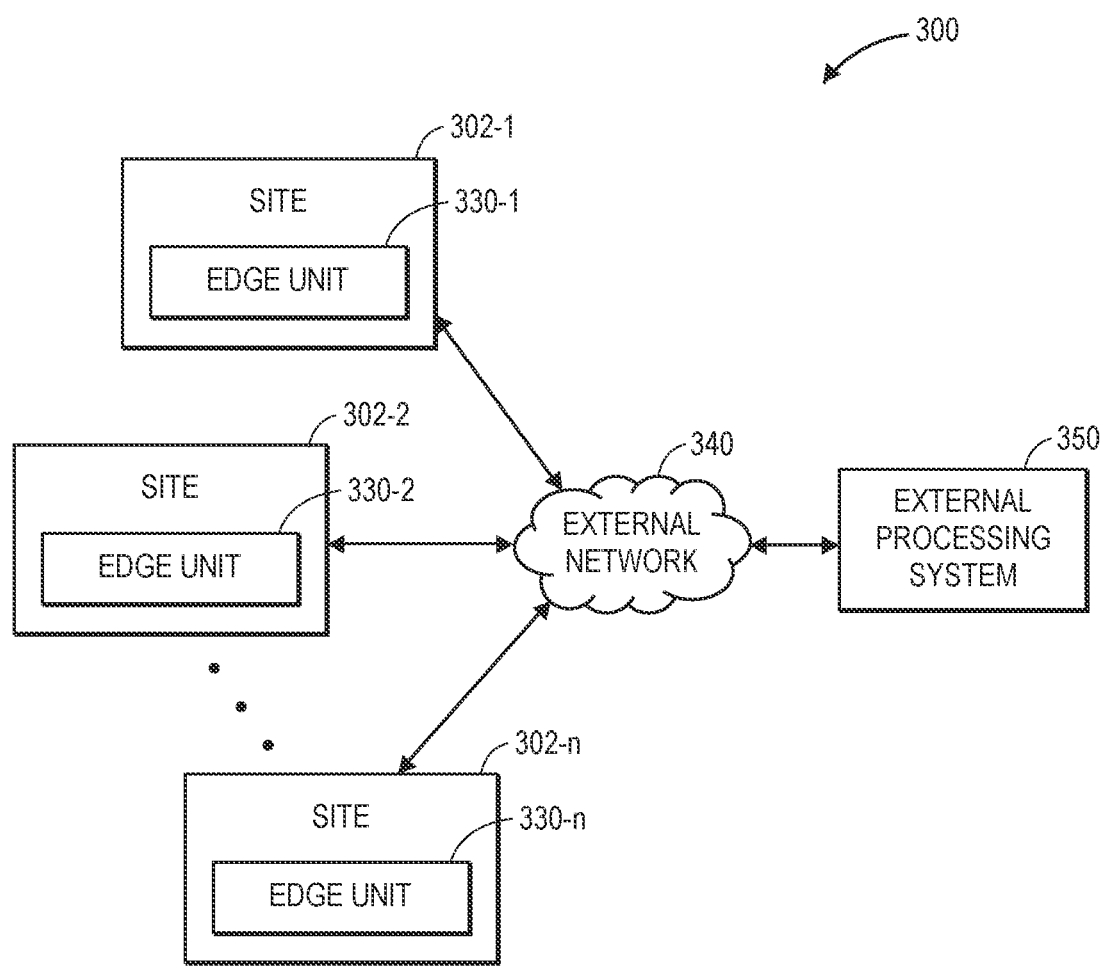
FIGS. 3A and 3B are block diagrams of an example system, in accordance with disclosed implementations.
Figure 3B:
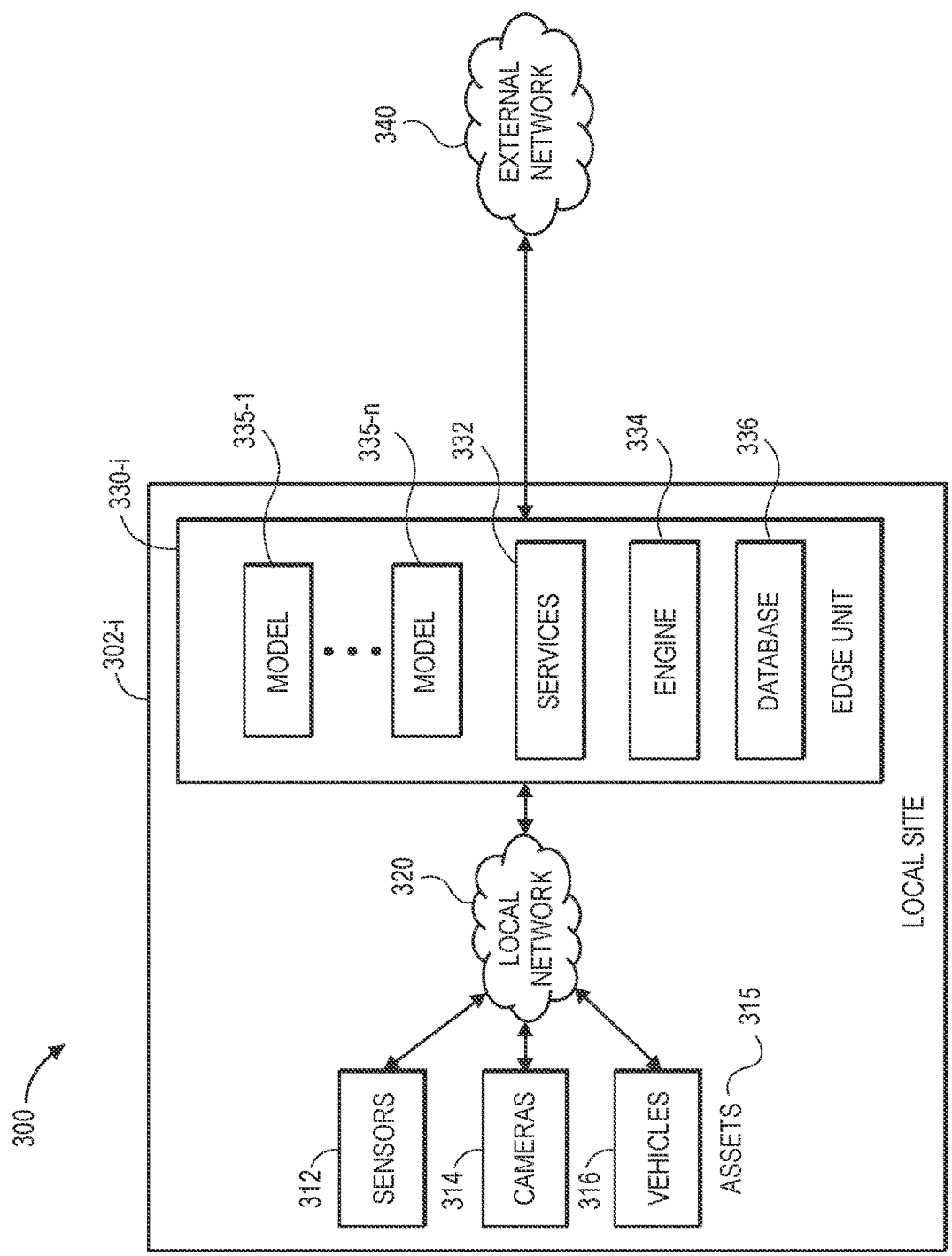

FIGS. 3A and 3B are example block diagrams of one system 300 in accordance with implementations of the present disclosure. Edge computing apparatuses may be provided at any site or location and in any number, and may be connected to one another or any external systems over one or more external networks.

As is shown in FIG. 3A, the edge computing system 300 includes a plurality of edge computing units (or systems) 330-1, 330-2 . . . 330-n and an external processing system 350. The plurality of edge computing units 330-1, 330-2 . . . 330-n are distributed at various local sites 302-1, 302-2 . . . 302-n, which may also be referred to herein as "edge locations," and connected to one another and the external processing system 350 over an external network 340, which may include the Internet in whole or in part. Each of the sites 302-1, 302-2 . . . 302-n may include any number of edge computing units 330-1, 330-2 . . . 330-n.

As is shown in FIG. 3B, a representative of one of the sites 302-1, 302-2 . . . 302-n including a representative one of the edge computing units 330-1, 330-2 . . . 330-n is shown. The edge computing unit 330-i may be used to implement or perform one or more aspects of the present disclosure. The edge computing unit 330-i may also be referred to as an "edge device" or an "edge compute unit." In some implementations, the edge computing unit 330-i may be provided as a high-performance compute and storage ("HPCS") and/or elastic-HPCS ("E-HPCS") edge device.

As is further shown in FIG. 3B, the edge computing unit 330-i may be in communication with any number of assets 315 at the site 302-i, including one or more sensors 312, one or more cameras 314, and one or more vehicles 316, or others. At least some of the assets 315 may be robotic devices (e.g., the robotic device 152 shown in FIG. 1A) that may be controlled by users via natural language commands issued by the users. Some assets 315 may be devices monitored by the edge computing unit 330-i. For example, in an industrial setting, some of the assets 315 may include gauges to measure temperature, pressure, or other aspects of an industrial complex or of machinery therein.

The edge computing unit 330-i may transmit information or data to such assets 315, or receive information or data from such assets 315, during operations of such assets 315 at the site 302-i, over one or more local networks 320. Such local networks 320 may include, but need not be limited to, one or more networks or other systems or techniques for communicating via any wired or wireless systems or protocols, including but not limited to cellular, Wireless Fidelity (or "Wi-Fi"), radio frequency identification (or "RFID"), near-field communication (or "NFC") readers, Bluetooth®, or any other type of systems or protocols.

The site 302-i may be any one of a plurality of environments or deployment locations associated with the edge computing unit 330-i. The site 302-i may be a geographic location or area associated with an enterprise user (or another user) of edge computing, or an edge location in a data network topography in terms of data network connectivity. Alternatively, or additionally, the site 302-i may be both a geographic location of an enterprise user and an edge location in the data network topography.

The edge computing unit 330-i may be configured as a containerized edge compute unit or data center for implementing sensor data generation or ingestion and inference for one or more trained machine learning or artificial intelligence models provided thereon. For instance, the edge computing unit 330-i may include computational hardware components configured to perform inference for one or more trained machine learning or artificial intelligence models. As is shown in FIG. 3B, one portion of the edge computing unit 330-i may include hardware resources associated with or used to implement a first model 335-1, while another portion of the edge computing unit 330-i may include hardware resources associated with or used to implement an n-th model 335-n, where n may be any number of different machine learning or artificial intelligence models that may be operated simultaneously or in parallel. The model or models executing by the edge computing unit 330-i may also be referred to herein as an "edge model" or "edge models."

In some cases, the system 300 may utilize the edge computing systems 330-1, 330-2 . . . 330-n provided at one or more of the sites 302-1, 302-2 . . . 302-n to capture and process information or data received locally via the local networks 320, e.g., from any of the assets 315, and transmit the data to one or more external computing systems 350 over one or more external networks 340.

The local network 320 may provide any number of communication links between the edge computing system 330-i and respective ones of the assets 315. In some implementations, one or more aspects of the local network 320 may be implemented as a private or public "5G" network, "4G" network, "Long-Term Evolution" network, or other cellular network. Alternatively, or additionally, one or more aspects of the local network 320 may be implemented as a Wireless-Fidelity (or "Wi-Fi") network, a Bluetooth® network, a Zigbee network, a Z-wave network, a Long Range (or "LoRa") network, a Sigfox network, a Narrowband Internet of Things (or "NB-IoT" network, or any other short-range wireless network.

The edge computing unit 330-*i* may receive different types of information or data from any number of the assets 315, and may transmit any type of information or data received from such assets 315 to any number of external computing systems 350. For example, in some implementations, the edge computing unit 330-*i* may receive streams of information or data from any of the sensors 312, which may include but need not be limited to one or more position sensors (e.g., Global Positioning Satellite system receivers, accelerometers, compasses, gyroscopes, altimeters), imaging devices (e.g., digital cameras, depth sensors, range cameras, infrared cameras, radiographic cameras or other optical sensors), speedometers (e.g., anemometers), thermometers, barometers, hygrometers, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges or sound sensors (e.g., microphones, piezoelectric sensors, vibration sensors or other transducers for detecting and recording acoustic energy from one or more directions). The sensors 312 may also include any number of memory or storage components and processors, photosensitive surfaces, filters, chips, electrodes, clocks, boards, timers or any other relevant features (not shown) for aiding in their operation.

In some implementations, the edge computing unit 330-*i* may also receive streams of information or data from any of the cameras 314, which may include imaging devices of any type or form, e.g., digital cameras, depth sensors or range cameras, infrared cameras, radiographic cameras or other optical sensors. The cameras 314 may be configured to photograph or otherwise capture visual information or data (e.g., still or moving images in color or black and white that may be captured at any frame rates, or depth imaging data such as ranges), or associated audio information or data, or metadata, regarding objects or activities occurring at the site 302-*i*, or for any other purpose.

For example, the cameras 314 may be configured to capture or detect reflected light if the reflected light is within fields of view of the cameras 314, which may be defined as a function of a distance between an imaging sensor and a lens within one of the cameras 314, viz., a focal length, as well as positions of the cameras 314 and angular orientations of their respective lenses. The cameras 314 may further include manual or automatic features for modifying a field of view or orientation. For example, one or more of the cameras 314 may be configured in a fixed position, or with a fixed focal length (e.g., fixed-focus lenses) or angular orientation. Alternatively, one or more of the cameras 314 may be configured with actuated or motorized features for adjusting a position (e.g., pan), a focal length (e.g., zooming the imaging device) or an angular orientation (e.g., the roll angle, the pitch angle or the yaw angle), by causing a change in a distance between the imaging sensor and the lens (e.g., optical zoom lenses or digital zoom lenses), a change in a position of the cameras 314, or a change in one or more of the angles defining the angular orientation of the cameras 314.

In some implementations, one or more of the cameras 314 may be an imaging device that is hard-mounted to a support or mounting that maintains the cameras 314 in a fixed configuration or angle with respect to one, two or three axes. Alternatively, one or more of the cameras 314 may be provided with one or more motors and/or controllers for manually or automatically operating one or more of the components, or for reorienting the axis or direction of the cameras 314, i.e., by panning or tilting the cameras 314. Panning the cameras 314 may cause a rotation within a horizontal plane or about a vertical axis (e.g., a yaw), while tilting the cameras 314 may cause a rotation within a vertical plane or about a horizontal axis (e.g., a pitch). Additionally, one or more of the cameras 314 may be rolled, or rotated about its axis of rotation, and within a plane that is perpendicular to the axis of rotation and substantially parallel to a field of view of the cameras 314.

In some implementations, the edge computing unit 330-*i* may also receive streams of information or data from any of the vehicles 316, which may include, but need not be limited to, one or more autonomous ground vehicles, one or more autonomous aerial vehicles (e.g., drones), or any other vehicle of any type, such as cars, trucks, trailers, freight cars, container ships or aircraft, which may be manned or unmanned (e.g., drones). Such vehicles 316 may be outfitted with any number of the sensors 312 or the cameras 314 described herein.

The vehicles 316 may receive information or data of any type or form from the edge computing unit 330-*i*, and transmit information or data of any type or form to the edge computing unit 330-*i*. The vehicles 316 may also receive information or data of any type or form from the edge computing unit 330-*i*, and transmit information or data of any type or form to the assets 315, e.g., the sensors 312 or the cameras 314. For example, in some implementations, the edge computing unit 330-*i* may provide information or data regarding any number of configurations or controls to the assets 315. In some other implementations, the edge computing unit 330-*i* may receive onboard camera feed and other sensor information, e.g., 3D range scanner, LiDAR, or odometry information for Simultaneous Localization and Mapping (or "SLAM"), from the vehicles 316, and may transmit any number of instructions to the vehicles 316.

In some embodiments, the assets 315 may include other robotic devices. For example, an asset may be a robotic arm used to move components in a warehouse or other space, move tools, and so forth. The robotic arm may be controlled using natural language commands provided by a user and translated to low-level machine controls readable by the robotic arm to allow the robotic arm to perform desired actions. In some implementations, the assets 315 may include robotic workers, actuators, motors, and/or other devices that can be controlled by user input to perform desired actions. As discussed in greater detail below, these assets may be controlled by users that provide natural language commands, which are translated to low-level machine controls readable by the assets to cause the assets to perform desired actions.

Additionally, in some implementations, the edge computing unit 330-*i* may be further utilized to execute one or more sets of instructions for locally storing information or data, executing one or more of the models 335-1 . . . 335-*n*, e.g., for inference, predictions or responses, or performing any other tasks or functions at the edge computing unit 330-*i*, with limited to no reliance on any external computing systems 350, e.g., in the "cloud." For example, the edge computing unit 330-*i* may also be used to perform inference or generate predictions locally, e.g., by executing one or more of the trained or pretrained machine learning or artificial intelligence models 335-1 . . . 335-*n* that may be received from any external computing systems 350 or any other edge computing units.

Results or predictions generated by the models 335-1 ... 335-n may be compressed and periodically uploaded by the edge computing unit 330-i to external computing systems 350, e.g., in the "cloud," over the external network 340, which may include a satellite network configured to provide wireless satellite connectivity between the edge computing unit 330-i at the site 302-i and existing network infrastructure. Such results or predictions may be included in batch uploads transmitted over the external network 340, which may act as an Internet backhaul link, to any number of external computing systems 350. Additionally, in some implementations, results or predictions may be utilized immediately at the edge computing unit 330-i, and transmitted in compressed form to the external computing systems 350, e.g., in the "cloud," at a later time. For example, the external network 340 may be used to provide periodic transmission or upload of compressed prediction or inference results, e.g., during high-bandwidth or low-cost availability hours associated with the external network 340.

In some implementations, results or predictions may be obtained by performing one or more essential functions or tasks using the models 335-1 ... 335-n, while offloading more computationally intensive and/or less time-sensitive tasks from the edge computing unit 330-i to other machine learning or artificial models executed by one or more external computing systems 350, e.g., in the "cloud." For example, in some implementations, machine learning or artificial intelligence models operated by remote computing systems, e.g., the external computing systems 350, may be utilized to train or fine-tune one or more of the models 335-1 ... 335-n, and updated versions of such models may be transmitted to the edge computing unit 330-i over the external networks 340, e.g., via a network backhaul. In some implementations, the models 335-1 ... 335-n may be trained, fine-tuned, retrained or replaced in an iterative or continuous manner. For example, in some implementations, the edge computing unit 330-i may be configured to perform scheduled or periodic downloads or updates of the models 335-1 ... 335-n based on information or data received from the external computing systems 350. Downloads or updates of the models 335-1 ... 335-n may be distributed to the edge computing unit 330-i in a "push" fashion, whereby the external computing systems 350 transmit updated or models to edge computing unit 330-i over the external networks 340, e.g., via a network backhaul, as updated or new models become available.

The edge computing unit 330-i may further include any number of services 332 for executing or operating with any external computing systems 350, e.g., in the "cloud," as well as an engine 334 (e.g., a high-performance compute engine) for implementing or managing the models 335-1 ... 335-n, and one or more databases (e.g., data stores) 336 for maintaining information or data of any type or form thereon.

Figure 4:
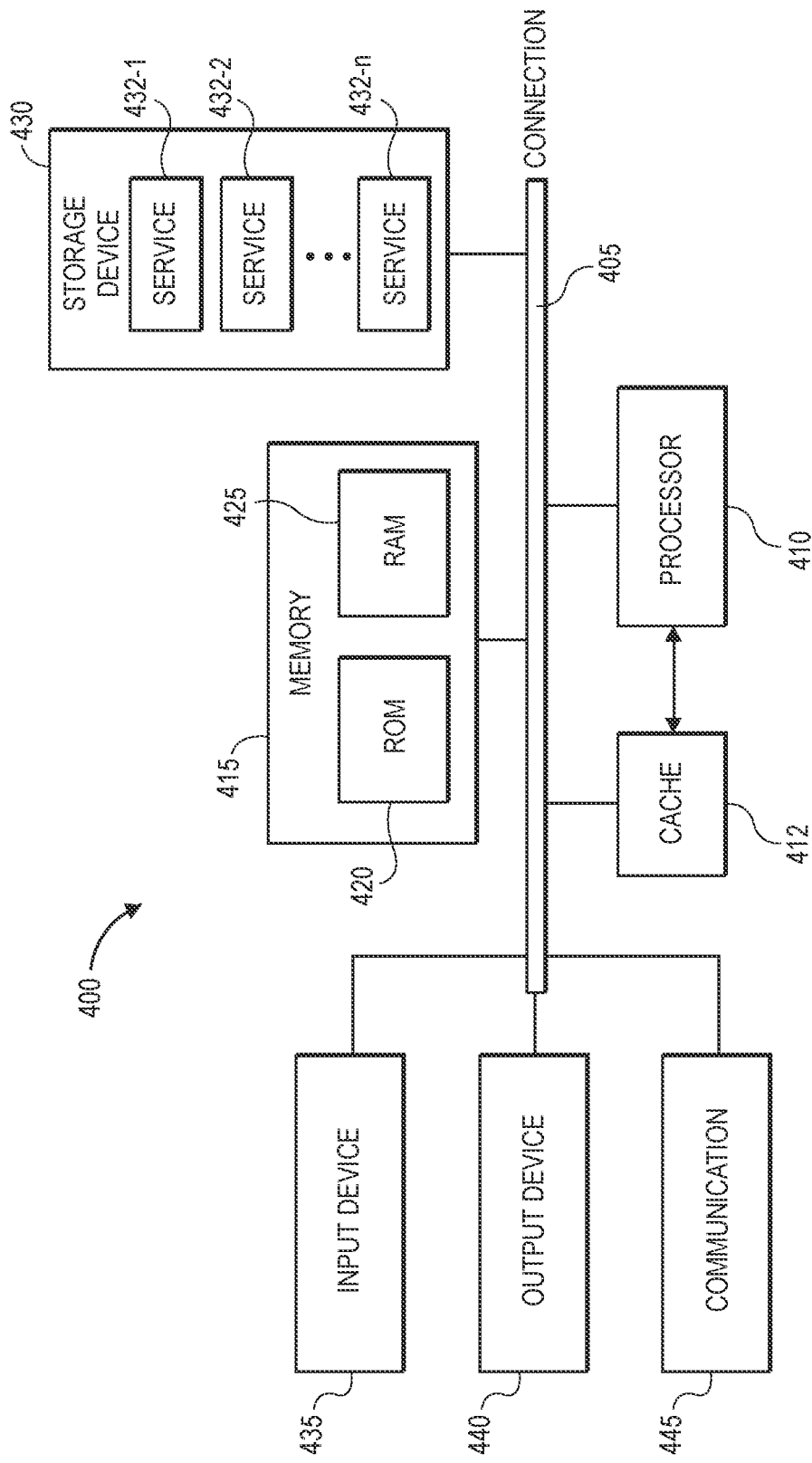
FIG. 4 is an example computing device architecture, in accordance with disclosed implementations.

Components of computing devices or systems described herein may be arranged or configured in any number of discrete architectures. Referring to FIG. 4, a computing device architecture 400 of the present disclosure is shown. In some examples, the computing device architecture 400 may be provided on an edge computing unit, such as the edge computing apparatuses 200 of FIGS. 2A and 2B, the edge computing units 330-i, 330-1, 330-2 ... 330-n of FIGS. 3A and 3B, or any other edge computing apparatuses or units. Alternatively, or additionally, the computing device architecture 400 may be provided on any other type or form of computing devices, such as mobile devices (e.g., smartphones, tablet computers, or the like), desktop computers, laptop computers, wearable devices (e.g., glasses or headsets for augmented reality or virtual reality, wrist watches, or others), servers, autonomous vehicles, robotic devices, televisions that may include one or more processors, memory components or data stores, displays, sensors, input/output (or "I/O") devices, or other systems or components that may be configured to execute one or more sets of instructions or commands described herein.

As is shown in FIG. 4, components of the computing device architecture 400 may be in electrical communication with each other by way of a connection 405, e.g., a bus. The computing device architecture 400 shown in FIG. 4 includes a processor unit 410 (e.g., a CPU, a GPU, or another processor unit) coupled to various components of the computing device architecture 400, including but not limited to a set of memory components 415, e.g., a cache of high-speed memory connected directly with, in close proximity to, or integrated as part of the processor 410, such as read-only memory ("ROM") 420 and random-access memory ("RAM") 425. The processor unit 410 may be any general-purpose processor or a special-purpose processor, such as a self-contained system.

The computing device architecture 400 also includes a storage device 430 including one or more sets of data or instructions for performing various services 432-1, 432-2 ... 432-n. The storage device 430 may be a non-volatile memory, a hard disk or another type of computer-readable media that may store data that is accessible to the computing device architecture 400 or other computers, such as magnetic cassettes, flash memory cards, solid state memory devices, digital versatile disks, cartridges, as well as the memory 415, e.g., the ROM 420, the RAM 425, and any others. One or more of the services 432-1, 432-2 ... 432-n may be provided and executed for controlling the processor unit 410 or any other aspect of the computing device architecture 400.

The computing device architecture 400 further includes an input device 435, an output device 440 and a communications interface 445. The input device 435 enables interaction with the computing device architecture 400 and may represent any number of input mechanisms, e.g., a microphone for receiving sounds or speech signals, a touch-sensitive screen for receiving gestures or other manual inputs, or others. The output device 435 may represent any number of output mechanisms, e.g., a display, a projector, a television, a speaker device, or others. The communications interface 445 may be configured to govern or manage inputs received from users via the input device 435 and outputs to be provided to such users via the output device 440.

As used herein, the terms "device," "system" or "unit" need not be limited to any one or a specific number of physical objects (such as one smartphone, one controller, one processing system and so on), and may instead refer to any system having any number of parts that may implement any portions of the present disclosure. Likewise, the terms "device," "system" or "unit" are not limited to any configuration, type, or number of objects.

Devices implementing processes and methods according to these disclosures may include hardware, software, firmware, middleware, microcode, hardware description languages, or any combinations thereof, and may take any of a variety of form factors. When implemented in software, firmware, middleware, or microcode, the program code or code segments to perform the necessary tasks (e.g., a computer-program product) may be stored in a computer-readable or machine-readable medium.

Figure 5:
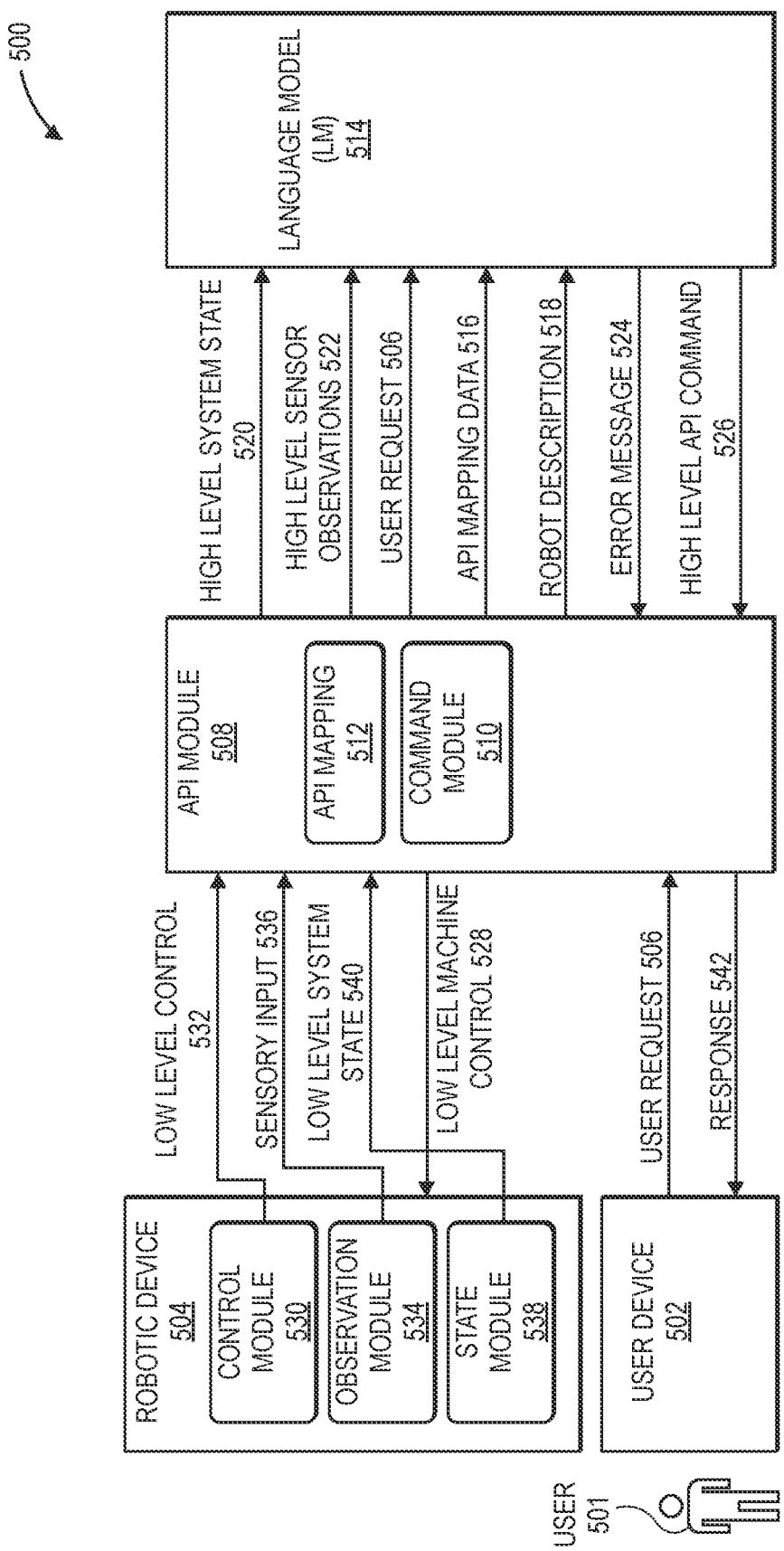
FIG. 5 is an example block diagram of an illustrative environment to provide natural language control of robotic devices, in accordance with disclosed implementations.

FIG. 5 is an example block diagram of an illustrative environment 500 to provide natural language control of robotic devices, in accordance with disclosed implementations. The environment 500 may include a user 501 associated with a user device 502 and a robotic device 504. The robotic device 504 may be any device configured to execute the commands (e.g., natural language commands, etc.) received from a user after processing by components described herein. Although the robotic device 504 may be located separate from the user 501 and the user device 502 and may be controlled wirelessly, the robotic device may be hardwired to the user device 502 or to other devices. In some implementations, the robotic device 504 may be a multiaxial camera device (e.g., a PTZ camera) or other camera device. However, the robotic device may be a remotely controlled vehicle, a mechanical arm, a robotic appliance, or other type of robotic device that performs operations on behalf of users that issue natural language commands. In some embodiments, the environment 500 may include multiple robotic devices under control of the user. For example, multiple robotic devices may be selected from different types of robotic devices and/or may be provided in different locations. The robotic devices may be deployed together to accomplish a requested task or may operate independently depending on the configuration.

As discussed above, the user 501 may issue a natural language command via the user device 502 to cause the robotic device 504 to perform one or more requested operations. For example, a user may issue a natural language command of "locate a vehicle in the scene and then zoom in to the license plate and copy the license plate information." A user request 506 from the user device 502 may be received by an API module 508, also referred to herein as an interface module. The API module 508 may include a command module 510 that may receive the user request 506. The API module 508 may be part of a transformer model used to transform the user request 506 received as a natural language command into low-level machine controls and logic to perform an action intended by the user 501. The API module 508, or another module, may translate the user request 506 into a formatted user request that can be further processed. The translation may include speech-to-text translation, parsing the request, and/or other formatting of the request to enable further processing of the user request.

The API module 508 may include an API mapping 512 that includes a mapping of high-level commands to low-level machine controls. For example, a high-level command for the example above may be "zoom_in" while the low-level command may be "zoom=1.25" among other possible examples of API mappings. In some instances, the API mapping 512 may be designed specifically for a certain robotic device. However, in some instances, a generic API mapping may be deployed for a certain type or class of robotic devices, and may be updated, modified, or otherwise tailored for use with a specific robotic device as described below with reference to FIG. 10.

After receipt of the user request 506, the command module 510 may transmit a request to a LM 514. The LM 514 may be a large language model or other natural language model capable of receiving natural language instructions and other information and transforming those instructions to commands in accordance with rules provided to the LM 514 by the API module 508, for example. The LM 514 may be trained with data that includes sample instructions and associated commands, along with other training data to enable the LM 514 to process natural language commands as described herein. The command module 510 may provide the LM 514, as part of the request or in advance of the request, with at least some of: the user request 506 (potential pre-processed), API mapping data 516, a robot description 518, a high-level system state 520, and/or high-level sensor observations 522, among other possible information. In the example above, the request may include "locate a vehicle in the scene and then zoom in to the license plate and copy the license plate information," API mapping data for zooming functions and other relevant functions, and a robot description such as "a multiaxial camera with a field of view of a parking lot and an entry of the parking lot. The request may include the high-level system state of "camera on, actively tracking vehicle xyz" and observation data of "tracking blue van moving in the parking lot."

In various embodiments, the LM 514 may use some or all of the data in the request to determine whether the request is possible. The robot description 518 may include parameter data for the robotic device indicating functionality that the robotic device is capable to perform. Parameter data for a multiaxial camera device may include zoom capabilities, panning movement increments, maximum angles for rotation, and so forth. As another example, the user request 506 may be a request to move the robotic device to a different location (e.g., move forward 5 ft.). However, the robot description 518 may indicate that the robotic device is a fixed position device. Such a device cannot "move forward" as requested by the user 501. In this example, the LM 514 may determine that the user request 506 is not possible and may transmit a response to the API module 508, such as an error message 524. The response may indicate that the requested task is not possible based on information provided to the LM 514.

The LM 514 may determine an error or that the task is not possible based on other information, such as the high-level system state 520 and/or the high-level sensor observations 522. For example, the high-level system state 520 may provide information about a configuration of the robotic device, including power state, direction, heading, zoom setting, etc. The LM 514 may determine that the user request 506 is in conflict with the high-level system state 520, such as a user request to "power down a drone midflight" when the high-level system state 520 indicates that the drone is in flight. The LM 514 may indicate an error or otherwise provide the error message 524 that the robotic device 504 cannot be powered down midflight based on a predetermined rule intended to protect the drone and/or objects on the ground from being hit by an unpowered (i.e., free falling) drone. The high-level sensor observations 522 may include observations from the robotic device, such as video imagery captured by the robotic device, which may be transformed into textual data that describes the video imagery. The LM 514 may determine that the user request 506 is in conflict with the high-level sensor observations 522, such as a user request to "track the blue van in the field of view" when the robotic device is a camera and the high-level sensor observations 522 do not include any vehicles in the field of view. However, in this example, the LM 514 may find this request possible for future execution, and may process the instruction accordingly. In various embodiments, the LM may suggest other actions when a requested action is not possible. For example, when the request is to "zoom in on a vehicle" and the system state indicates that the zoom level is fully zoomed in, then the suggestion may be to "pan" or "zoom out" since no further zoom in is possible.

When the LM 514 determines that the user request 506 is possible, the LM 514 may determine one or more high-level commands 526 that correspond to the user request 506 based on processing the natural language command and based on at least the API mapping data 516, and possibly based on the high-level system state 520 and/or the high-level sensor observations 522. For example, the user request 506 may be to "track a car and zoom in on its license plate." The LM 514 may transform this user request into multiple high-level commands included in the API mapping data 516 and provide logic to implement the commands. For example, the high-level mapping commands may include {track vehicle}, {locate license plate}, and {zoom in on license plate}, among other possible high-level commands. In some instances, the LM 514 may determine logic (e.g., criteria, conditions, etc.) for the high-level commands to satisfy the user request. In the example above, the LM 514 may perform {track vehicle} to create a bounding box around a vehicle in the field of view of the robotic device while performing {locate license plate} until a license plate is located, and then may perform {zoom in on license plate}, and so forth.

The LM 514 may send the high-level command 526 to the API module 508. As discussed above, the high-level command 526 may include or be associated with multiple commands and/or logic to implement the commands (e.g., criteria, conditions, etc.). The command module 510 of the API module 508 may receive the high-level command 526 from the LM 514. The command module 510 may associate the high-level command 526 with the user request 506. The API module 508 may use the API mapping 512 to translate the high-level command 526 to a low-level machine control 528, possibly including logic to implement the control(s). The low-level machine control 528 may include multiple controls in some situations depending on the high-level command 526, the logic, and/or other factors. The command module 510 may send the low-level machine control 528 (or multiple controls) and possibly the logic to the robotic device 504 for execution. In the example above, the high level commands may be "locate a vehicle," "zoom in on license plate," and "copy license plate." The logic may include a condition, such as "when the license plate is in view, "zoom in on license plate" and then "copy license plate." The logic may then indicate to "go to next vehicle" or may include other logic.

The robotic device 504 may receive the low-level machine control 528 via a control module 530. The control module 530 may process the low-level machine control 528 to cause the robotic device 504 to perform the action or series of actions requested by the user 501 in the user request 506. For example, the control module 530 may cause certain motors to turn on/off, capture imagery, and so forth.

Meanwhile, the robotic device 504, via the control module 530, may send low-level controls 532 to the API module 508, which may be used to create the API mapping 512, confirm actions performed by the robotic device 504, or may be used for other purposes.

The robotic device 504 may include an observation module 534, which may generate sensory input 536 for transmission to the API module 508. The API module 508 may translate the sensory input 536 into the high-level sensor observations 522, which can then be provided to the LM 514, as discussed above, for example. The robotic device 504 may include a state module 538, which may generate a low-level system state 540 for transmission to the API module 508. The API module 508 may translate the low-level system state 540 into the high-level system state 520, which can then be provided to the LM 514, as discussed above, for example. The translation by the API module 508 of the sensory input 536 and/or the low-level system state 540 may make this data standardized and capable of processing by the LM 514 as the high-level sensor observations 522 and/or high-level system state 520. For example, the low-level system state 540 may only indicate a power status of a component, while the high-level system state 520 may include an indication of the component, prior state information, the power status, and/or other information for processing by the LM 514.

Ultimately, the user 501, via the computing device 502, may receive a response 542 based on the action of the robotic device 504. The response 542 may be provided by the API module 508 and may be based on the sensory input 536 and/or the low-level system state 540. In the example above where the user requested zooming in to license plates, the response 542 may be a video feed where the imagery includes tracked vehicles and occasional imagery of enlarged license plates. The response may include the copied license plate, which may be converted to text and added to a log, for example, to track vehicles that use the parking lot. Other outputs may be used for the response 542, including text outputs, audible outputs, robotic movements observable by the user 501, and so forth.

In some instances, the response 542 may indicate that the user request 506 is not possible for execution by the robotic device 504 and/or may provide suggested actions, logic for actions, and/or other data4. For example, when the user request 506 included actions not capable of performance by the hardware included in the robotic device 504, the response 542 may include the error message 524 and possible suggested actions or other information to inform the user 501 that the request cannot be performed by the robotic device 504, or possibly by other components such as the API module 508 and/or the LM 514, while other suggested actions can be performed.

Figure 6:
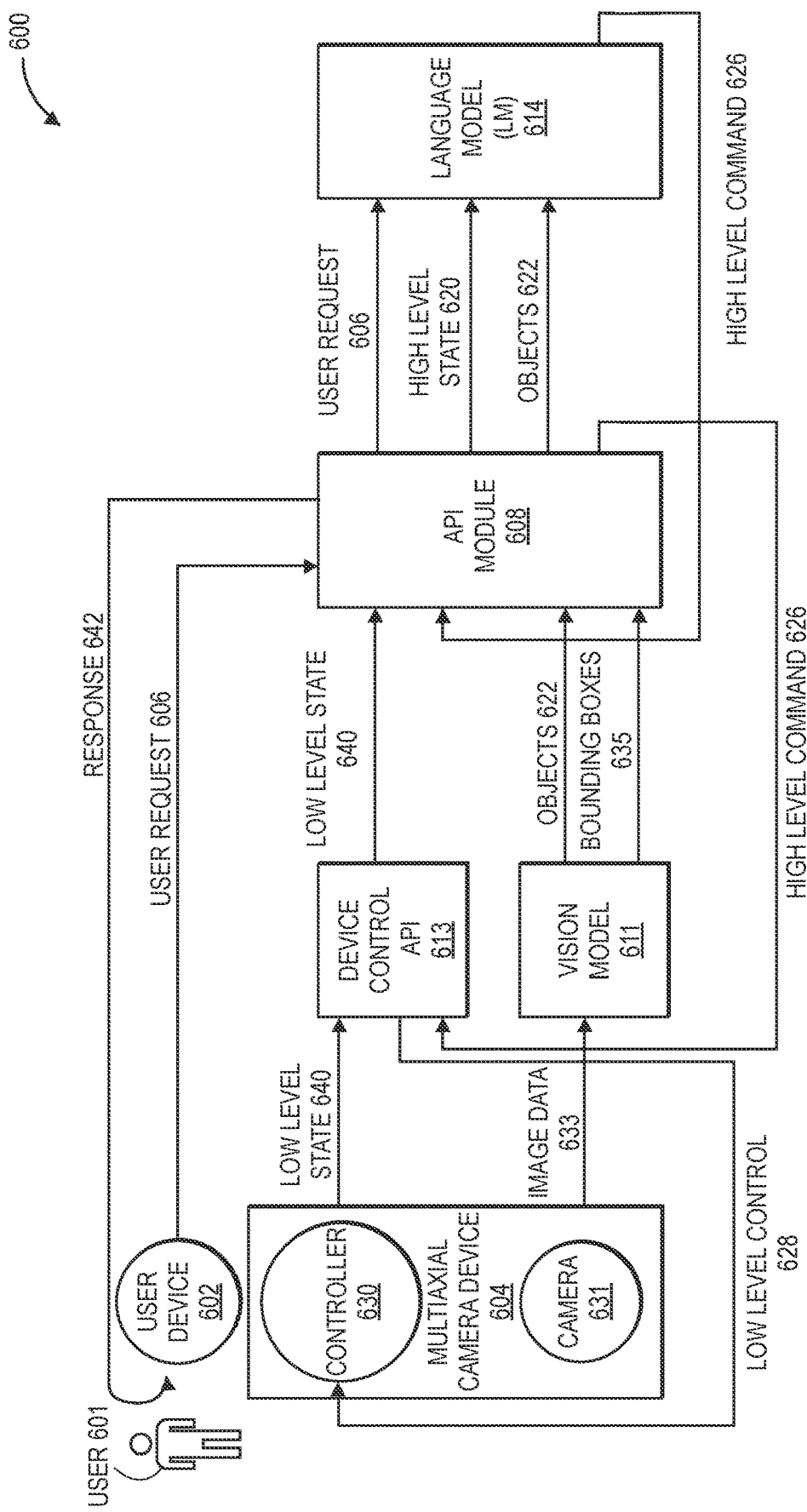
FIG. 6 is an example block diagram of another illustrative environment to provide natural language control of robotic devices, in accordance with disclosed implementations.

FIG. 6 is an example block diagram of another illustrative environment 600 to provide natural language control of robotic devices, in accordance with disclosed implementations. The environment 600 may include a user 601 associated with a user device 602 and a multiaxial camera device 604. The multiaxial camera device 604 may be a pan/tilt/zoom (or "PTZ") camera. The multiaxial camera device 604 may be located separate from the user 601 and the user device 602 and may be controlled wirelessly. However, in some implementations, the multiaxial camera device may be hardwired to the user device 602. Although the environment 600 is described as including the multiaxial camera device 604, the environment 600 may be implemented using other robotic devices described herein, including vehicles, robotic arms, robotic appliances, and so forth.

In some embodiments, the environment 600 may include multiple multiaxial camera devices under control of the user. For example, multiple multiaxial camera devices may be selected from different types of multiaxial camera devices and/or may be provided in different locations. The multiaxial camera devices may be deployed together to accomplish a requested task or may operate independently depending on the configuration. For example, the multiaxial cameras may be used together for surveillance and tracking of objects across a facility or large area of land. For example, the multiaxial cameras may be deployed by a system similar to the system 300 shown in FIG. 3A, which may include multiple edge units.

As discussed above, the user 601 may issue a natural language command via the user device 602 to cause the multiaxial camera device 604 to perform one or more requested operations. For example, the user 601 may input text to the user device 602 or may provide spoken words (speech input) to the user device 602 (e.g., received via a microphone). A user request 606 from the user may be received by the API module 608. The API module, or another module, may translate the user request into a formatted request for further processing, possibly including speech-to-text translation of the user request. The API module 608 may send the formatted user request to a large language model 614 (or "LLM 614"). In some embodiments, the LLM 614 may be a standalone or condensed model for execution by an edge device, such as the edge computing unit 130 described with reference to FIG. 1A.

The environment 600 may include an API module 608, also referred to herein as an interface module. The API module 608 may be an interface between a vision model 611 (or "CV") and the LLM 614. The API module 608 may also interface with a device control API 613. The API module 608 may be referred to as part of a transformer model. In some embodiments, the API module 608 may be generic and configured for deployment with different types of robotic devices or classes of robotic devices. Meanwhile, the vison model 611 and/or the device control API 613 may be customized for a specific robotic device or for a specific class or type of robotic devices (e.g., image capture devices, etc.). In some embodiments, the vison model 611 and/or the device control API 613 may be created, updated, or maintained using a process described below with reference to FIG. 10. The device control API 613 may include an API mapping that includes a mapping of high-level commands to low-level machine controls. This mapping may be specific for a specific multiaxial camera device, for example.

The API module 608 may transmit a high-level state 620 to the LLM 614. The API module 608 may also provide objects 622 to the LLM 614. The objects 622 may be received from the vision model 611 as discussed below. In some embodiments, the API module 608 may provide other information to the LLM 614, such as a processed version of the user request 606, API mapping data, and/or a robot description.

The LLM 614 may use some or all of the data from the API module 608 to determine whether the request is possible. For example, the user request 606 may be a request to rotate the multiaxial camera device to change a field of view. However, device control API 613 may indicate that the multiaxial camera device is a fixed position device. Such a device cannot "rotate" as requested by the user 601. In this example, the LLM 614 may determine that the user request 606 is not possible and may transmit a message to the API module 608 as an error message. The error message may indicate that the requested task is not possible based on information provided to the LLM 614. The LLM may determine an error or that the task is not possible based on other information. In some embodiments, the LLM 614 may provide a suggested command that is possible based on the input received that was not possible. In the example, above, the LLM 614 may output a suggestion for the user to zoom in on an area instead of rotating, for example. The LLM 614 may learn suggestions based on trained data and associations when users revise commands in response to receipt of an error message.

When the LLM 614 determines that the user request 606 is possible, the LLM may determine one or more high-level commands 626 that correspond to the user request 606 based on processing the natural language request and based on at least the high-level state 620 and/or other information provided by the API module 608, the device control API 613, and/or the vision model 611. For example, the user request may be to "track a person in a scene and pan to follow the person." The LLM 614 may transform this user request into multiple high-level commands and may include logic. For example, the high-level mapping commands may include {identify person}, {track person}, and {pan to follow person}, among other possible high-level commands. In some instances, the LLM 614 may determine logic (e.g., criteria, conditions, etc.) for the high-level commands to satisfy the user request. In the example above, the LLM 614 may perform {track person} to create a bounding box around a person in the field of view of the multiaxial camera device while performing {pan to follow person}.

The LLM 614 may send the high-level command 626 to the API module 608. As discussed above, the high-level command 626 may include multiple commands and/or logic to implement the commands (e.g., criteria, conditions, etc.). The API module 608 may receive the high-level command 626 from the LLM 614 and send the high-level command 626 to the device control API 613. In various embodiments, the API module 608 may transform the high-level command 626, include logic, and/or perform other transformations prior to sending the high-level command to the device control API 613. For example, the API module 608 may provide framework or structure between commands and logic used to issue the commands prior to sending the information to the device control API 613.

The device control API 613 may associate the high-level command 626 with the user request 606. The device control API 613 may use an API mapping to translate the high-level command 626 to a low-level control 628, possibly including logic to implement the controls. The low-level control 628 may include multiple controls in some situations depending on the high-level command 626 and other factors. The device control API 613 may send the low-level control 628 (or multiple controls) and possibly logic to the multiaxial camera device 604 for execution.

The multiaxial camera device 604 may receive the low-level control 628 via a controller 630. The controller 630 may process the low-level control 628 to cause the multiaxial camera device 604 to perform the action or series of actions requested by the user 601 in the user request 606. For example, the controller 630 may cause certain motors to turn on/off (e.g., pan motors, tilt motors, zoom motors, etc.). Meanwhile, the controller 630 may transmit signals to a camera 631 of the multiaxial camera device 604 to cause the camera 631 to capture imagery.

The multiaxial camera device 604 may send a low-level state 640 to the device control API 613. In some embodiments, the device control API 613 may translate the low-level state 640 into the high-level state 620, which can then be provided to the API module 608 and/or directly to the LLM 614, as discussed above, for example. In various implementations, the multiaxial camera device 604 may send image data 633 to the vision model 611. The vision model 611 may process the image data 633 to identify the objects 622 and possibly generate bounding boxes 635 around at least some of the objects. The bonding boxes 635 may provide boundaries and/or location information, labels, and/or other data about the objects 622. The objects 622 and/or the bounding boxes 635 may be sent to the API module 608 for further processing. For example, the API module 608 may process the objects 622 and/or the bounding boxes 635 to provide modified object data to the LLM 614, such as objects with labels, bounding boxes, and/or other relevant data.

Ultimately, the user 601, via the computing device 602, may receive a response 642 based on the action of the multiaxial camera device 604. The response 642 may be provided by the API module 608 and may be based on the image data 633 and/or the low-level system state 640. In the example above where the user requested tracking a person, the response may include a video feed where the imagery includes a tracked person possibly with a bounding box that indicates information about the person (e.g., time of initiating tracking, where tracking initiated from, etc.). However, other data may be provided as the response 642, including textual information, imagery, sensor data, or any other type of information or feedback in response to execution of a command by the robotic device in response to the user request.

In some instances, the response 642 may indicate that the user request 606 is not possible for execution by the multiaxial camera device 604 as discussed above. For example, the user request 606 included actions not capable of performance by the hardware included in the multiaxial camera device 604. The response 642 may include an error message or other information to inform the user 601 that the request cannot be performed by the multiaxial camera device 604, or possibly by other components such as the API module 608 and/or the LLM 614. In such situations, the response may include a suggestion for a command that is executable by the multiaxial camera device 604.

Although the environment 600 describes the multiaxial camera device 604 such as a PTZ camera, other robotic devices may be deployed in the environment 600 without deviating from the spirit of the disclosure. In addition, certain elements of the environment 600 may be combined with elements of the environment 600 to obtain results as described herein. For example, the user request may be provided from the user device directly to the LLM 614 as shown in the environment 600, while using the components and configuration shown in environment 500 that includes the API module 508.

Figure 7A:
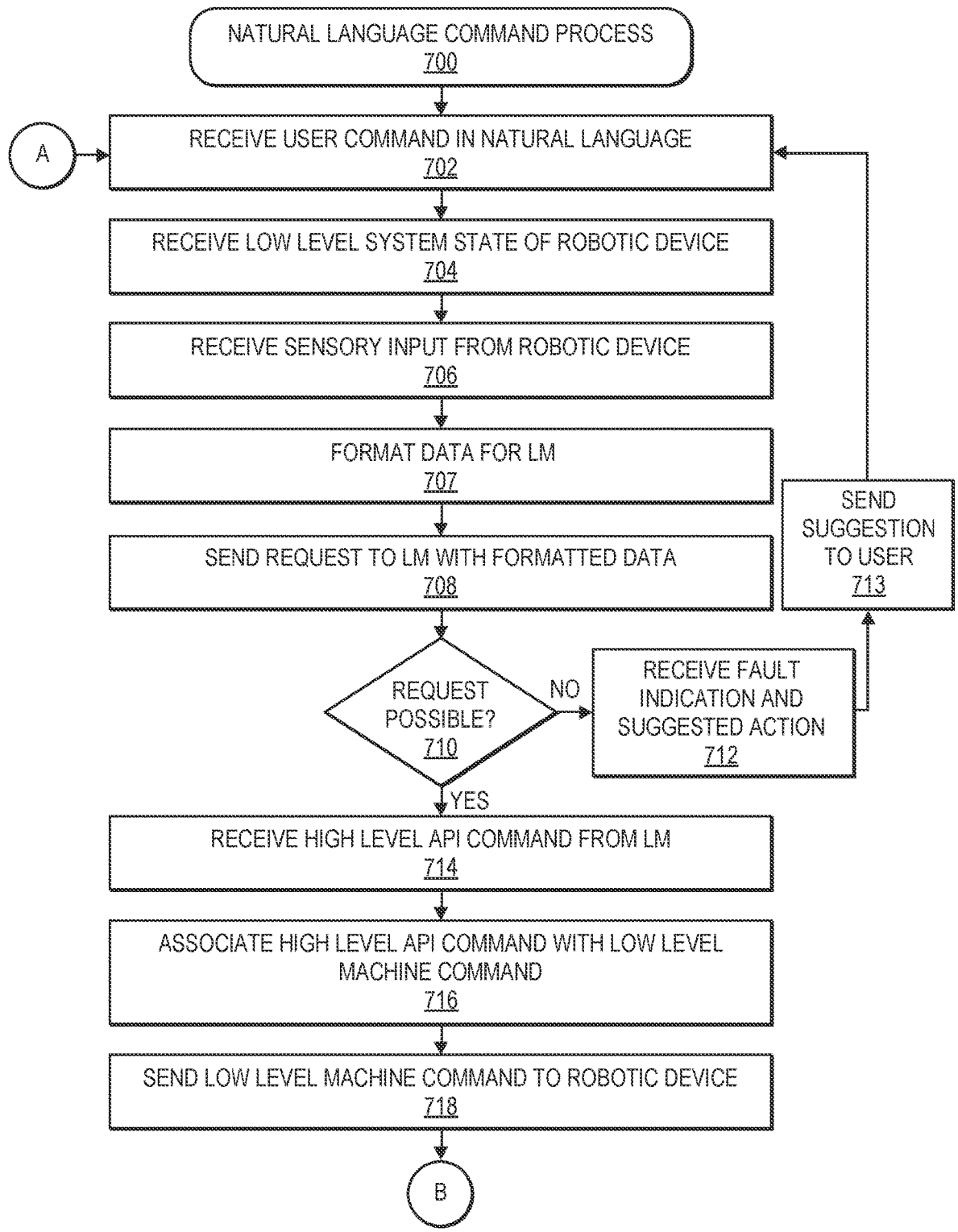
FIGS. 7A and 7B are flow diagrams of an example process to transform natural language commands into low-level machine controls to operate robotic devices, in accordance with disclosed implementations.
Figure 7B:
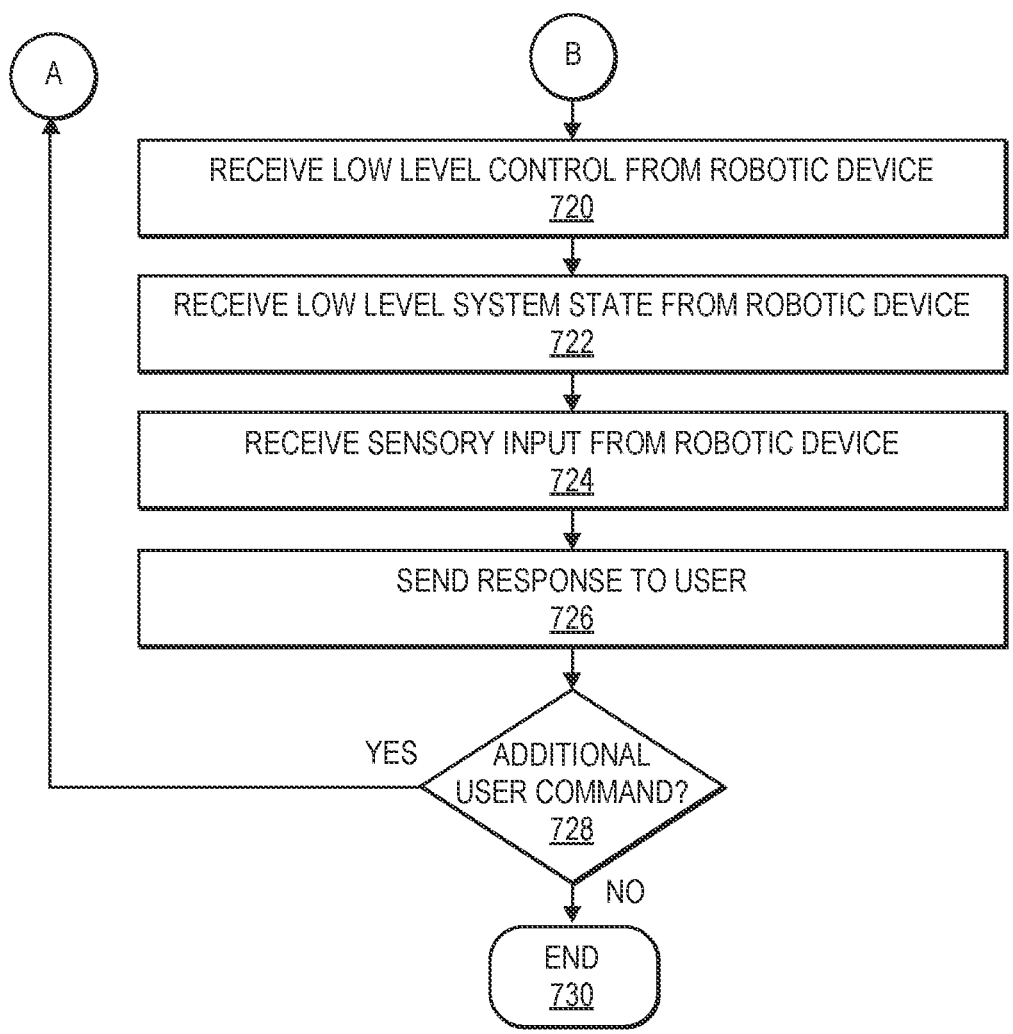

FIGS. 7A and 7B are flow diagrams of an example process 700 to transform natural language commands into low-level machine controls to operate robotic devices, in accordance with disclosed implementations. The example process of FIGS. 7A and 7B and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation and any number of the described operations can be combined in any order and/or in parallel to implement the routine. Likewise, one or more of the operations may be considered optional. Operations from different processes may be combined as further implementations, including sub-processes combined with high-level processes and the like.

The example process 700 shown in FIGS. 7A and 7B may be performed by a system (e.g., servers 176 via the command processing manager 174, the API module 508, the API module 608, etc.) or possibly by multiple systems. The process 700 begins by receiving, by the system, a natural language command or instruction from a user, as in 702. However, in some embodiments, the instruction may be generated by a system or may be based on an earlier instruction that is ongoing or requires further processing. The natural language instruction may be received as spoken words, textual input, or by other means. In some instances, the natural language instruction may include image information, audio information, or other data as part of an instruction or request. For example, the request may be directed to control a PTZ camera device to "find and track a person that looks like the person in the included image." As another example for the PTZ camera device, the request may be to "track the blue van and zoom in on the driver when possible." When the robotic device is a mechanical arm, an example request may be to "locate the first part and connect it to the second part." The natural language instruction may not include all necessary steps to perform an intended action. In the prior example, the natural language instruction may not include "grab the object" or "move the object," which are both implied actions to accomplish "connect it to the second part." The natural language instruction may not include specific computer or machine logic to implement the action, but such logic may be inferred in the natural language instruction.

The system may receive a low-level system state of robotic device, as in 704. The robotic device may be any robotic device described herein, including a PTZ camera device, a mechanical arm, a vehicle, and so forth. The low-level system state may indicate a power status (e.g., on, off, idle), a position (e.g., at XYZ location, coordinate, latitude/longitude, etc.), a zoom state, tilt state, or any other power, a status, or location information obtainable from the robotic device that can be used to understand that system state of the robotic device.

The system may receive sensory input from robotic device, as in 706. The sensory input may be imagery captured or recorded by a camera (e.g., video, still images, infrared images, thermal images, physical senses, or other sensor information captured by the robotic device, such a temperature, pressure, force, and so forth).

The system may format or otherwise translate data from the operations 702-706 for receipt by the LM, as in 707. For example, the user request (operation 702) may be received as audio data (e.g., speech captured by a microphone, etc.), and may be translated/formatted to text using a speech-to-text process. The low-level system state (operation 704) may be formatted, parsed, or otherwise translated for receipt by the LM. For example, the low-level system state may be translated to a textual description of the system state that is understood by the LM, such as by converting a signal output (e.g., binary data, signal data, visual data, etc.) to a descriptive textual output. The sensory input (operation 706) may be translated to textual input based on specifications for the LM. For example, the output may be imagery which may be translated to a textual description of a scene captured in a field of view using object recognition processing (e.g., scene include a blue vehicle and a person, etc.). The formatted data may be parsed, labeled, formatted, and/or otherwise prepared for sending to the LM in a formatted manner to enable the LM to process the request and associated data.

The system may send a request to a language model with formatted data 708. The LM may be a large language model that is trained to complete tasks using significant amounts of training data. The LM may translate speech to text or speech may be translated to text prior to receipt by the LM. Examples of the LM may include Mistral (provided by Mistral AI), Zephyr (provided by Zephyr AI), and GPT-3.5 (or 4.0) (provided by OpenAI), however other systems are continually being made available and utilize neural networks to obtain similar results. The relevant data in the request to the LM may include the user request or portions thereof from 702, the low-level system state or portions thereof from 704, the sensory input or portions thereof from 706, parameter data indicating functionality of the robotic device, and/or other data. For example, the request may include a context statement, such as to set a tone for conversation or communication expectations for use by the LM. The request may include high-level commands that may be performed by the robotic device. The high-level commands may include generic commands that can be executed by the robotic device, and that are associated with low-level machine controls read and executed by the robotic device. Examples of high-level commands for a camera device are provided below:

pan_left: instructs the camera to move horizontally to the left.
  pan right: instructs the camera to move horizontally to the right
  tilt down: instructs the camera to move vertically downward
  tilt up: instructs the camera to move vertically upward
  zoom in: instructs the camera zoom level, allowing for a closer view of the scene
  zoom out: decreases the camera zoom level, providing a wider view of the scene
  search(object): instructs the camera to actively search for a specific object, denoted as "object."
  track(object): tells the camera to continuously track and follow the specified object, denoted as "object."
  stop: tells the camera to stop any ongoing camera movement, searching, or tracking operation
  idle: tells the camera to stop with its current operation Other high-level commands may be used by other robotic devices. The request may provide some or all of the information discussed above at 708.

In some embodiments, the system may instruct the LM to provide reasoning for some or each action, decision, output, or other task performed by the LM. For example, the LM may receive a request with parameters, may execute the request, and may then provide reasoning, via textual output or by other means, that explain or otherwise document how a task was performed by the LM. The system may request the LM to provide status information, such as when a task is started, when the LM is idle or waiting for instructions, when a task is completed, and so forth. This information may be provided to the user, for example, to enable interaction with the LM and successfully control the robotic device while receiving understandable feedback in response to the natural language instruction.

The system may receive a response from the LM indicating whether the request is possible for performance by the robotic device, by the LM, or by other components in the system, as in 710. For example, the request may be to zoom in on a person. However, if the robotic device does not include a zoom lens or digital zoom capability, the LM may or the system may determine that task is not possible. In some instances, the task may be possible, but may not be executable until a later time. For example, an instruction to "track a blue van and capture an image of its license plate" may not be actionable until video of a blue van is captured. If no vehicles are in a field of view of the robotic device's camera, the task may not be immediately actionable.

When the request is not possible (following the "no" route from 710), the process may receive a fault indication and may also receive one or more suggested alternative action, as in 712. For example, the system may receive the fault indication from the LM that the task is not possible and provide an output to the user indicating the same or the LM may provide other outputs, such as suggestions of possible requests that can be performed, explanations about why the task could not be performed, etc. As an example, the user request may be to locate an object in the field of view of a camera. However, the current system state of the camera may indicate that the camera is at full zoom and has a narrow field of view that does not include the object. In this instance, the system may suggest that the user instruct the camera to zoom out to a wide field of view to enable locating the object, for example. The suggested action(s) may be based on a system state of the robotic device or other relevant data. Following the receipt of the fault indication and possible suggested action(s), the system may send the indication and suggested action(s) to the user for consideration, as in 713. In such instances, processing may continue at 702 where the user may submit another natural language command, which may include selection of a suggested action as suggested in the operation 712. Processing may continue as described above from 702 to the decision operation 710, possibly with some operations omitted.

When the request is possible (following the "yes" route from 710), the process may continue processing at 714. The system may receive a high-level API command from LM, as in 714. The high-level command may be any of the high-level commands discussed above, such as "tilt up." The system may also receive logic to execute the high-level command. The logic may include conditions, criteria, or other controls used to perform the high-level command and cause the robot device to achieve a desired action provided in the natural language command. The logic may cause multiple iterations of the high-level command or iterations with other commands, for example.

The system may then map the high-level command with low-level machine controls, as in 716. For example, the system may include an API mapping of high-level commands corresponding to low-level machine controls. The system may use this mapping to identify a low-level machine control to be sent to the robotic device, possibly along with logic and/or other information. For example, the LM may provide logic (e.g., conditions, criteria, etc.), code, and/or other information usable by the system to properly execute the low-level machine control(s) by the robotic device to accomplish the desired outcome or sequence of events requested by the user. In various embodiments, the LM may provide a recommendation for a task/subtask to perform in response to the user request (or based on other requests or event data). For example, the system may receive information on next steps to perform and reasons for the next steps, as provided by the LM.

The system may send low-level machine control(s), logic, and/or other information to the robotic device for execution by the robotic device, as in 718. For example, when the user command is to "track a blue van and take a picture of the license plate," the system might send the following low-level machine controls and logic (denoted between "< >"), for example: search(blue van), <and then> track(blue van) <until> search(license plate)=true, <and then> capture(license plate). In this example, the system may include four low-level machine controls (search, track, search, capture) along with various logic (e.g., until, and then, etc.). Other information may be included, such as an image file, audio, location coordinates, and so forth to enable to robotic device to perform the requested action.

Following the operation 718, processing may continue as shown in FIG. 7B (following route B), which shows possible operations that may occur in response to the robotic device executing the low-level machine command issued at 718. The system may receive a low-level control from the robotic device, as in 720. The low-level control may confirm execution of the low-level machine command from 718 and/or may provide other control information, such as when output of continued movements of motors, actuators, or other components of the robotic device.

The system may receive a low-level system state of robotic device, as in 722. The operation 722 may be similar to the operation 704 described above. For example, the low-level system state may change over time, thus the system may receive this information from time to time to accurately track the system state and possibly report the system state to the user.

The system may receive sensory input from the robotic device, as in 724. The operation 724 may be similar to the operation 706 described above. The sensory input may be imagery captured or recorded by a camera (e.g., video, still images, infrared images, thermal images, sensor data, or other sensor information captured by the robotic device, such a temperature, pressure, force, and so forth). However, the sensory input may be virtually any information captured by the robotic device in response to the user request and execution of the low-level machine command by the robotic device per the operation 718.

A response may be sent to the user including formatted data from one or more of the operations 720-724, as in 726. For example, the system may aggregate data, transform one or more data inputs, and generate a response for the user. The response may include graphical information, text information, or both. The response may be directly related to the user request (e.g., video imagery showing a requested action or object, etc.), confirmation of action by the robotic device, and/or other relevant data that may satisfy the user's request.

The system may determine whether the user desires to issue another natural language command, as in 728. When an additional command is desired, processing may continue via the "yes" route through "A" to the operation 702 shown in FIG. 7A where the user may issue another natural language command. The additional user request may be related to a prior request or a new request that is not related to the prior request. When no further request is desired at the operation 728, then the process may follow the "no" route and end, as in 730.

Figure 8:
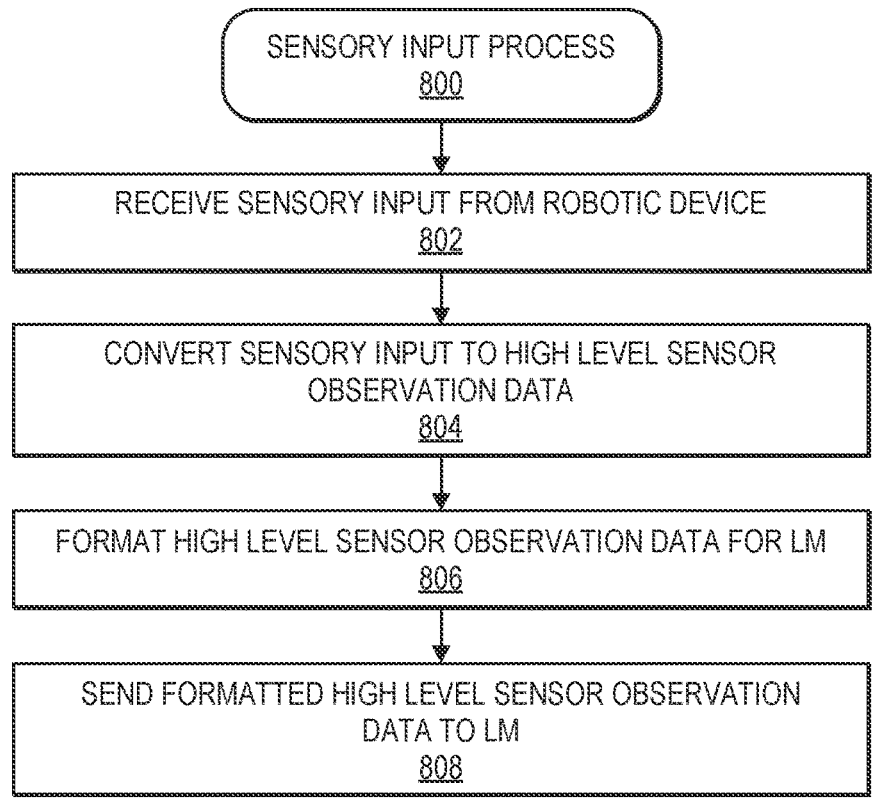
FIG. 8 is a flow diagram of an example process to transform sensory input to high-level sensor observation data, in accordance with disclosed implementations.

FIG. 8 is a flow diagram of an example process 800 to transform sensory input to high-level sensor observation data, in accordance with disclosed implementations. The example process 800 may be performed by a system (e.g., the API module) or possibly by multiple systems. The process 800 begins by receiving, by the system sensory input from the robotic device, as in 802. As discussed above with reference to 706 from FIG. 7A, the sensory input may be imagery captured or recorded by a camera (e.g., video, still images, infrared images, thermal images, physical senses (e.g., temperature, pressure, force, etc.), or other sensor information captured by the robotic device.

The system may convert sensory input to high-level sensor observation data, as in 804. For example, the system may augment the sensory input such as when the sensory input is imagery that may be analyzed to identify an object and modified with a bounding box around at least a portion of the object. In some embodiments, the system may convert the observation data to textual information that describes the sensory information. For example, the sensory information may include imagery with a blue van driving along a street near a building and the system may convert this information to high-level sensor observation data such as "blue van driving east on highway 101 westbound near building addressed 1100 Park Street." The high-level sensor data may be generated by the robotic device in some instances, such as when the robotic device is configured to detect objects or perform other processing actions.

The system may format the high-level sensor observation data for processing by the LM, as in 806. For example, the high-level system data may include machine information that is not readily understood by the LM. The high-level sensor observation may be translated, parsed, or otherwise formatted such that the formatted high-level sensor observation data is readable and understood by the LM. In some embodiments, formatting may include generating a textual description of the high-level sensor observation data and/or creating other variations of the data for further processing by the LM.

The system may send the formatted high-level sensor observation data to the LM, as in 808. As discussed above with reference to 708 from FIG. 7A, the system may send a request to the LM with information that includes the high-level sensor observation data. In some instances, the high-level sensor observation data may be sent to the LM through a feedback loop to provide continual information to the LM using information obtained by the robotic device, thereby creating a loop or other type of continuous processing of a request. In various embodiments, some are all of the steps of the process 800 may be performed by the vision model 611 described above with reference to FIG. 6.

Figure 9:
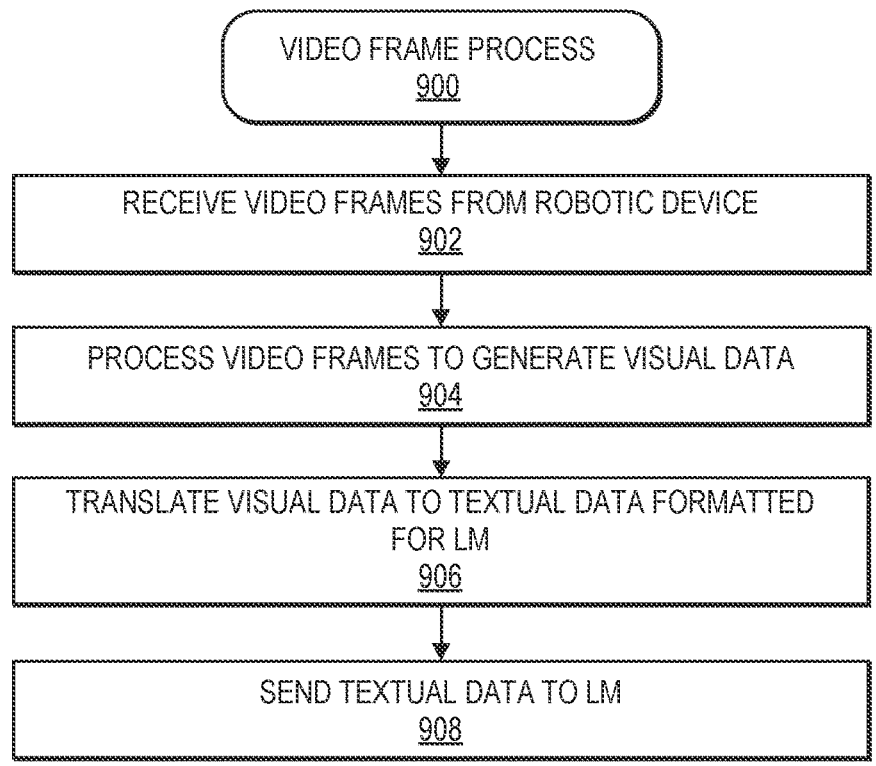
FIG. 9 is a flow diagram of an example process to transform video frames to visual data, in accordance with disclosed implementations.

FIG. 9 is a flow diagram of an example process 900 to transform video frames to visual data, in accordance with disclosed implementations. The example process 900 may be performed by a system (e.g., the API module 508, the API module 608, etc.) or possibly by multiple systems. The process 900 begins by receiving, by the system, imagery frames from the robotic device 902. The video frames may be a series of still images, video frames, continuous video data, compress imagery data, or other types of image data that can be analyzed to detect changes over time analogous to a frame-by-frame comparison.

The system may process image frames to generate visual data, as in 904. For example, the system may analyze the frames of imagery to identify an object (e.g. identify a blue van, identify a person, etc.). The system may generate a bounding box around at least a portion of the object. For example, the imagery frames may include imagery with a blue van driving along a street near a building and the system may generate bounding boxes around the blue van and the building. The system may label the objects as "blue van" and "building" or use other appropriate labels to describe objects or information about objects. The system may extract or provide other information with the object, such as a time when an object first appeared (e.g., result of search function, etc.) or other relevant information that may be usable by the system, the LM, and/or by other components described herein.

The system may translate the visual data to textual data formatted for the LM, as in 906. For example, the visual data may include information that is not readily understood by the LM. The visual data may be translated to textual data, such as by using an object detection algorithm or other suitable translation techniques to translate visual information to textual information understandable by the LM. As an example, the visual data may include a scene showing a blue van moving along a street. The scene may be translated to textual information that describes the scene, such as "blue van moving westbound on 3rd Ave at 27 miles per hour approaching cross street A," among many possible translations of the visual data. The textual information may include metadata about the scene in addition to a textual description of the scene.

The system may send the textual data to the LM, as in 908. As discussed above with reference to 708 from FIG. 7A, the system may send a request to the LM with information that includes a text version of the visual data. In some instances, the textual data may be sent to the LM through a feedback loop to provide continual information to the LM using information obtained by the robotic device, thereby creating a loop or other type of continuous processing of a request. In various embodiments, some or all of the steps of the process 900 may be performed by the vision model 611 described above with reference to FIG. 6.

Figure 10:
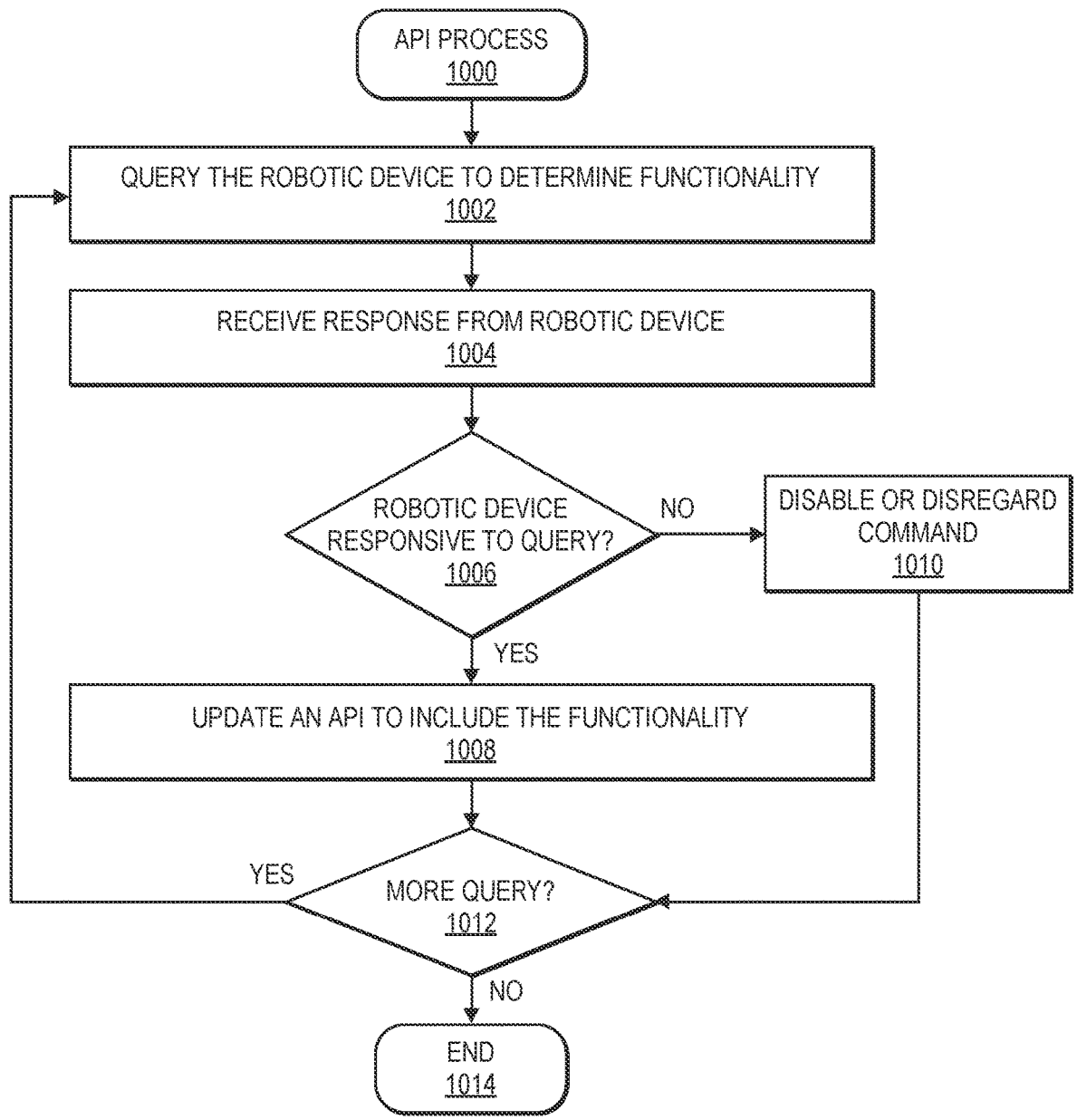
FIG. 10 is a flow diagram of an example process to create or update an API used to control a robotic device using natural language commands, in accordance with disclosed implementations.

FIG. 10 is a flow diagram of an example process 1000 to create or update an API used to control a robotic device using natural language commands, in accordance with disclosed implementations. The example process 1000 may be performed by a system (e.g., the API module) or possibly by multiple systems. The process 1000 begins by querying, by the system, the robotic device to determine functionality of the robotic device, as in 1002. In some embodiments, the system may send various low-level machine controls to the robotic device and monitor actions performed by the robotic device to determine whether the robotic device can implement those controls, such as using a trial and error approach to discovery of usable controls. This may be performed as a calibration process, for example. When the robotic device transmits an error or is unable to perform a low-level machine control, then the system may determine that that control is not valid for that robotic device. When the robotic device successfully performs an action corresponding to the low-level machine control, then the system may determine that the control is valid for the robotic device.

The system may receive a response from the robotic device, as in 1004. As described above, the response may be an error message, confirmation of an action performed, or other information that the system can use to determine whether the robotic device understood the low-level machine control. For example, the system may receive confirmation that the robotic device executed the low-level machine control as a response that is received at 1004.

The system may determine whether the robotic device is responsive to the query, as in 1006. For example, the system may determine that the robotic device is responsive to the query by receiving a confirmation from the robotic device, determining the robotic device performed the requested action properly (e.g., provided imagery corresponding to request, etc.), or otherwise confirming that the robotic device was responsive to the query.

When the system determines that the robotic device is responsive to the query (following "yes" route), then the system may update an API or other mapping to include relevant information about the robotic device, as in 1008. For example, the system may include the low-level machine control as enabled or available and may associate the low-level machine control with a high-level command usable by a LM, as discussed above. In some embodiments, the system may modify an existing API or mapping to include a new control or to modify parameters of a control. For example, the process 1000 may be used to modify a generic or prior API mapping of a robotic device or type/class of robotic devices when a new and different type/class of robotic device is deployed, such as an updated model or a robotic device with some different or additional functionality. For instance, a new camera with a more powerful zoom function, but otherwise having similar pan/tilt functionality as an existing robotic device may be queried in this way to update an API to discover the zoom functionality of the new camera robotic device.

When the system determines that the robotic device is not responsive to the query (following "no" route), then the system may disable or disregard the control and/or update an API or other mapping accordingly (e.g., removing nonfunctional controls, etc.), as in 1010. For example, the system may receive an error message from the robotic device, may receive no message or response from the robotic device, and/or may receive an incorrect response (e.g., no imagery as requested, etc.), which may indicate that the robotic device is not responsive to the query.

Following the operations 1008 and 1010, the system may determine whether to perform an additional query, as in 1012. For example, the system may test multiple controls using the process 1000, and each control may be tested with a loop of the above operations. When the system determines to perform another query (e.g., learn another low-level machine control), then the process 1000 may continue following the "yes" route and perform the operation 1002. When the system determines not to perform another query (following the "no" route), then the system may end processing, as in 1014.

Although some embodiments of the present disclosure show the use of edge computing units in support of operations in one or more industrial applications or functions, those of ordinary skill in the pertinent arts will realize that the systems and methods of the present disclosure are not so limited. Rather, the systems and methods of the present disclosure may be utilized in connection with any operations, and in support of any type of application or function.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures may indicate the same or similar items or features.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, a storage medium can be integral to a processor, and can be volatile or non-volatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 6% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A computing system, comprising:
   an interface module to translate a user request to control a multiaxial camera device at an edge location;
   a device control application program interface (API) including at least a mapping between high-level commands and low-level machine controls;
   one or more processors; and
   a memory storing program instructions that, when executed by the one or more processors, cause the one or more processors to at least:
   receive, by the interface module, the user request to control the multiaxial camera device, the user request including a natural language description of instructions for the multiaxial camera device to perform a sequence of operations;
   receive, by the interface module and from the multiaxial camera device, a low-level system state of the multiaxial camera device;
   send, by the interface module, a request to a large language model (LLM), the request including at least:
   a high-level system state of the multiaxial camera device determined based on the low-level system state;
   the user request;
   the high-level commands; and
   parameter data of the multiaxial camera device indicating functionality of the multiaxial camera device;
   determine, by the interface module and from the LLM in response to the request, that the user request can be performed by the multiaxial camera device based at least in part on the parameter data;
   receive, by the interface module and from the LLM in response to the request, at least one high-level command and logic to implement the at least one high-level command to cause the multiaxial camera device to perform the sequence of operations;
   associate, using the device control API, the at least one high-level API command with at least one low-level machine control; and
   send, using the device control API, the at least one low-level machine control and the logic to the multiaxial camera device to cause the multiaxial camera device to perform the sequence of operations at the edge location.

2. The computing system of claim 1, further comprising:
   a vision model to detect objects in images captured by the multiaxial camera device; and
   wherein the program instructions, when executed by the one or more processors, further cause the one or more processors to at least:
   receive, by the vision model, video frames from the multiaxial camera device;
   generate, by the vision model and using the video frames, a bounding box around an object using a vision model; and
   send, by the vision model, data descriptive of at least one of the bounding box or location information of the object to the interface module.

3. The computing system of claim 2, wherein the program instructions, when executed by the one or more processors, further cause the one or more processors to at least:

convert, by the vision model, at least a portion of the video frames to high-level sensor observation data;

translate the high-level sensor observation data to formatted high-level sensor observation data for processing by the LLM and send the formatted high-level sensor observation data to the LLM in association with the user request.

4. The computing system of claim 1, wherein the user request includes a request to track an object using the multiaxial camera device, and wherein the at least one low-level machine control causes the multiaxial camera device to:

locate the object;

activate a motor to rotate the multiaxial camera device to follow the object as the object moves with a field of view of the multiaxial camera device; and record imagery of the object.

5. The computing system of claim 1, wherein the interface module, the device control API, the one or more processors, and the memory are included within an edge device and are in communication via a local area network with the multiaxial camera device located at the edge location.

6. A computer-implemented method, comprising:

receiving a user request to control a robotic device, the user request including a natural language description to instruct the robotic device to perform a sequence of operations;

receiving, from the robotic device, a low-level system state of the robotic device;

determining the high-level system state of the robotic device based at least in part on the low-level system state received from the robotic device; and formatting the high-level system state for processing by the LM;

sending a request to a language model (LM), the request including at least:

the high-level system state of the robotic device determined based at least in part on the low-level system state;

at least a portion of the user request; and at least a portion of mapping data that associates high-level commands with respective low-level machine controls for the robotic device; and receiving, from the LM and in response to the request, at least one high-level command to cause the robotic device to perform the sequence of operations;

associating, using the mapping, the at least one high-level command with at least one low-level machine control; and sending the at least one low-level machine control to the robotic device to cause the robotic device to perform the sequence of operations.

7. The computer-implemented method of claim 6, further comprising:

receiving logic to implement the at least one low-level machine control; and sending the logic to the robotic device to cause the robotic device to perform the sequence of operations.

8. The computer-implemented method of claim 6, further comprising:

receiving sensory input from the robotic device;

converting the sensory input to high-level sensor observation data;

translating the high-level sensor observation data to formatted high-level sensor observation data for processing by the LM; and sending the formatted high-level sensor observation data to the LM in association with the user request.

9. The computer-implemented method of claim 6, wherein the user request includes a description of an object to track using the robotic device, and wherein the at least one low-level machine control causes the robotic device to locate the object.

10. The computer-implemented method of claim 9, further comprising:

receiving a plurality of video frames from the robotic device;

processing at least some of the plurality of video frames using a vision model to locate the object and generate a bounding box around the object; and sending data descriptive of at least one of the bounding box or location information of the object to the LM.

11. The computer-implemented method of claim 6, wherein:

the robotic device is a multiaxial camera device; and the user request includes a request to zoom in on an object using the robotic device, and wherein the at least one low-level machine control causes the multiaxial camera device to locate the object, zoom in on the object, and record imagery of the object.

12. The computer-implemented method of claim 6, further comprising:

receiving, in response to sending a low-level machine control to the robotic device, a response from the robotic device;

updating the mapping based on the response received from the robotic device, wherein the updating includes at least one of:

disabling an existing high-level command;

modifying the existing high-level command; or adding a new high-level command.

13. The computer-implemented method of claim 6, further comprising:

receiving a reply from the LM in response to a first request to control the robotic device and issued by the user, the reply including at least:

a fault indictor indicating that the first request is not capable of performance by the robotic device; and a suggested command that is capable of performance by the robotic device; and sending the suggested command to the user prior to receiving the user request, wherein the user request includes at least a portion of the suggested command.

14. The computer-implemented method of claim 6, wherein the robotic device is at least one of a multiaxial camera device, a robotic arm, or a remotely controlled vehicle.

15. A computing system, comprising:

one or more processors; and a memory storing program instructions that, when executed by the one or more processors, cause the one or more processors to at least:

receive a user request to control a robotic device, the user request including a natural language description to instruct the robotic device to perform a sequence of operations;

receive a low-level system state of the robotic device;

send a request to a language model, the request including at least:

a high-level system state of the robotic device determined based on the low-level system state;

at least a portion of the user request;

parameter data of the robotic device indicating functionality of a multiaxial camera device; and at least a portion of mapping data that associates high-level commands to respective low-level machine controls for the robotic device;

determine that the user request can be performed by the robotic device based at least in part on the parameter data;

receive, in response to the request, at least one high-level command;

associate, using the mapping data, the at least one high-level command with at least one low-level machine control; and send the at least one low-level machine control to the robotic device to cause the robotic device to perform the sequence of operations.

16. The computing system of claim 15, wherein the program instruction, when executed by the one or more processors, further cause the one or more processors to at least:

receive logic to implement the at least one low-level machine control; and send the logic to the robotic device to cause the robotic device to perform the sequence of operations.

17. The computing system of claim 15, wherein the user request includes a description of an object to locate using the robotic device, and wherein the at least one low-level machine control causes the robotic device to locate the object.

18. The computing system of claim 15, wherein the robotic device is part of a fleet of robotic devices that comprise at least one of robotic arms or remotely controlled vehicles.

19. The computer-implemented method of claim 6, wherein:

the request further includes parameter data of the robotic device indicating functionality of the robotic device; and further comprising determining that the user request can be performed by the robotic device based at least in part on the parameter data.

20. The computing system of claim 15, wherein the program instruction, when executed by the one or more processors, further cause the one or more processors to at least:

format the high-level system state for processing by the language model.

* * * * *